(12) United States Patent
Iyengar et al.

(10) Patent No.: US 6,360,205 B1
(45) Date of Patent: Mar. 19, 2002

(54) OBTAINING AND UTILIZING COMMERCIAL INFORMATION

(75) Inventors: Maya L. Iyengar, Aurora; Aaron J. Reid, Lakewood; Antoine K. Toffa, Parker; Russel W. Heithoff, Aurora, all of CO (US)

(73) Assignee: Trip.com, Inc., Englewood, CO (US)

( * ) Notice: Subject to any disclaimer, the term of this patent is extended or adjusted under 35 U.S.C. 154(b) by 0 days.

(21) Appl. No.: 09/263,310

(22) Filed: Mar. 5, 1999

Related U.S. Application Data

(60) Provisional application No. 60/106,423, filed on Oct. 30, 1998.

(51) Int. Cl.[7] ............................................... G06F 17/00
(52) U.S. Cl. ............................................. 705/5; 705/80
(58) Field of Search ................................ 705/5, 80, 79, 705/6

(56) References Cited

U.S. PATENT DOCUMENTS

| | | | | |
|---|---|---|---|---|
| 4,775,936 A | * | 10/1988 | Jung .............................. | 705/5 |
| 4,931,932 A | * | 6/1990 | Dalnekoff et al. ............. | 705/5 |
| 5,237,499 A | * | 8/1993 | Garback ........................ | 705/5 |
| 5,239,480 A | * | 8/1993 | Huegel .......................... | 705/5 |
| 5,253,165 A | * | 10/1993 | Leiseca et al. ................ | 705/5 |
| 5,253,166 A | * | 10/1993 | Dettelbach et al. ........... | 705/5 |
| 5,289,371 A | * | 2/1994 | Abel et al. ..................... | 705/5 |
| 5,422,809 A | * | 6/1995 | Griffin et al. .................. | 705/5 |
| 5,483,444 A | * | 1/1996 | Heintzeman et al. .......... | 705/5 |
| 5,570,283 A | * | 10/1996 | Shoolery et al. .............. | 705/5 |
| 5,652,867 A | * | 7/1997 | Barlow et al. ............. | 395/500 |
| 5,732,398 A | * | 3/1998 | Tagawa ......................... | 705/5 |
| 5,781,892 A | * | 7/1998 | Hunt et al. .................... | 705/5 |
| 5,797,127 A | * | 8/1998 | Walker et al. ................. | 705/5 |
| 5,832,451 A | * | 11/1998 | Flake et al. .................... | 705/5 |
| 5,832,454 A | * | 11/1998 | Jafri et al. ..................... | 705/6 |
| 5,839,114 A | * | 11/1998 | Lynch ............................ | 705/5 |
| 5,933,810 A | * | 8/1999 | Okawa .......................... | 705/5 |
| 5,940,803 A | * | 8/1999 | Kanemitsu ..................... | 705/6 |
| 5,948,040 A | * | 9/1999 | Delorme et al. ............ | 701/201 |
| 5,953,705 A | * | 9/1999 | Oneda ........................... | 705/5 |
| 5,978,770 A | * | 11/1999 | Waytena et al. ............... | 705/5 |
| 5,983,220 A | * | 11/1999 | Schmitt ......................... | 707/5 |

FOREIGN PATENT DOCUMENTS

| JP | 409114885 A | * | 5/1997 | |
|---|---|---|---|---|

OTHER PUBLICATIONS

"http://www.usairways.com", "Itinerary, Price and Alternative", p. 1, 1998.*

(List continued on next page.)

*Primary Examiner*—James P. Trammell
*Assistant Examiner*—Pierre E Elisca
(74) *Attorney, Agent, or Firm*—Sheridan Ross P.C.

(57) ABSTRACT

In accordance with the present invention, a method for providing reservation information related to airline flights, lodging, transportation and the like using a communications network is disclosed. In one embodiment, access to a server machine is divided into sessions. During a first session a user machine makes a first request for reservation information from the server machine. This first request includes input data from a first customer which relates to the desired reservation information. For example, the first customer may input travel times in the hopes of booking a flight which corresponds to those times. The server machine requests the reservation information from a number of target sites based upon the input data. Included in the number of target sites is a first and second target sites. The server machine obtains reservation information which includes first and second reservation information respectively from the first and second target sites.

37 Claims, 29 Drawing Sheets

Microfiche Appendix Included
(3 Microfiche, 150 Pages)

OTHER PUBLICATIONS

"US Airways Launches Internet Reservations System", PR Newswire, 1616, Oct. 1998.*

"Software Provides Access to Airlines", USA Today, p. 1B, Oct. 1995.*

US Airways Offers online awards:, Air Transport World, v34, n 12 p 54, Dec. 1997.*

"http://www.usairway.com", "Select Your Departure Flight", p. 1, 1998.*

"http://www.usairways.com", "Review the ticket price information", p. 1, 1998.*

"http://www.usairways.com", "Reserve a Flight", p. 1, 1998.*

"http://www.usairways.com", "No Quotable Fare", p. 1, 1998.*

"http://www.usairways.com", "Login to Personal Travel Works", p. 1, 1998.*

Website of Travelterminal.com, 1999.*

Maddox, K., "Traveling on the web", Informationweek, Jan. 1997.*

Website of travelocity.com, 1999.*

Woods, L., "Booking your trip online", Kiplinger's Personal Finance Magazine, May 1997.*

McWill–iams, G., "Clipping Wings on the Web", Business Week, 1997.*

M2 PressWire, Internet Travel Network: Internet Travel Network Completes Strategic Investment from United Airlines, May 1998.*

Pack, T., "Travel Sites", Link–Up, Sep. 1997.*

Flint, P., "Sabre Unleashed", Air Transport World, Nov. 1996.*

Website of dealtime.com, 1998.*

PR NewsWire, "PR Newswire California Summary", Dec. 1998.*

Derwent –ACC–NO: 2000–365835; Heithoff, R. W. et al., May 2000.*

The Economist, "Roboshop", Jun. 14, 1997.

* cited by examiner

Login Information

LOGIN: ☐
PASSWORD: ☐
EMAIL: ☐

I WOULD LIKE INTELLITRIP TO
REMEMBER MY PASSWORD FOR ME  ○ YES  ● NO
READ THE COOKIE DISCLAIMER

SPECIAL WORD:  | 12345 |  | DRIVERS LICENSE # ▽ |

Miscellaneous

I TRAVEL PRIMARILY FOR:  ○ PLEASURE  ○ BUSINESS  ○ BOTH

[✓] I WOULD LIKE TO RECEIVE THETRIP.COM NEWSLETTER.
[✓] I WOULD LIKE TO BE NOTIFIED OF OFFLINE PROMOTIONS.
[✓] I WOULD LIKE TO RECEIVE MATERIAL FROM THETRIP.COM TRAVEL PARTNERS.

FIG. 6

Flight Preferences

SEATING CLASS | COACH ▽ |
SEATING PREFERENCE | WINDOW ▽ |
MEAL CHOICE | NORMAL ▽ |
HOME AIRPORT (ENTER ONLY CITIES OR AIRPORT CODES FOUND ON THIS LIST) | DEN ▽ |

SEARCH AIRPORTS NEAR DEPARTURE CITY? [✓]
SEARCH AIRPORTS NEAR ARRIVAL CITY? [✓]
WHEN SEARCHING, SORT RESULTS BY: | NO PREFERENCE ▽ |

FIG. 7

PLANNING A FLIGHT:     ROUND TRIP     ONE WAY

NEW TO INTELLITRIP
ANNOUNCEMENTS OF NEWLY ADDED AIRLINES HERE.

PLEASE CHOOSE THE TRAVEL SERVICES TO SEARCH

- [✓] www.aircanada.com
- [✓] www.alaskaair.com
- [✓] www.flyfrontier.com
- [✓] www.twa.com
- [✓] www.fly.virgin.com     [ ] All Airlines

DEPARTING CITY     DEPARTURE DATE & TIME

| DEN | JUL | 8 | 5 | am |

[✓] SEARCH ADDITIONAL NEARBY DEPARTING AIRPORTS

ARRIVING CITY     RETURN DATE & TIME

|  | JUL | 15 | 7 | pm |

[✓] SEARCH ADDITIONAL NEARBY ARRIVING AIRPORTS

ENTER ONLY CITIES OR AIRPORT CODES FOUND ON THIS LIST.

NUMBER OF PASSENGERS     MAXIMUM WAIT TIME

| 1 | I HAVE A FEW MINUTES (2.5 MINS) |

SEATING CLASS     SEARCH BY

| COACH | CLOSEST TIME TO QUERY |

Submit Query

FIG. 8

ITINERARY

DELTA AIR LINES  TRIPFACTS ABOUT DELTA AIRLINES
COST: $404.00 PER PASSENGER (NON-STOP)  BOOK THIS FARE WITH DELTA AIRLINES.  LINK TO WEB SPECIALS

| FLIGHT # | | CITY | DATE | TIME |
|---|---|---|---|---|
| DELTA 1197 | DEPARTING | DENVER, CO | 19 AUG 98 | 6:10 AM |
| | ARRIVING | LOS ANGELES, CA | 19 AUG 98 | 8:37 AM |
| DELTA 1549 | DEPARTING | DENVER, CO | 26 AUG 98 | 10:10 AM |
| | ARRIVING | LOS ANGELES, CA | 26 AUG 98 | 12:36 PM |

ITINERARY

UNITED  TRIPFACTS ABOUT UNITED AIRLINES
COST: $398.00 PER PASSENGER (NON-STOP)  BOOK THIS FARE WITH UNITED AIRLINES  LINK TO WEB SPECIALS

| FLIGHT # | | CITY | DATE | TIME |
|---|---|---|---|---|
| UNITED 612 | DEPARTING | DENVER, CO | 19 AUG 98 | 6:45 AM |
| | ARRIVING | LOS ANGELES, CA | 19 AUG 98 | 9:06 AM |
| UNITED 956 | DEPARTING | DENVER, CO | 26 AUG 98 | 9:30 AM |
| | ARRIVING | LOS ANGELES, CA | 26 AUG 98 | 12:02 PM |

ITINERARY

T W A  TRIPFACTS ABOUT T W A
COST: $401.00 PER PASSENGER (NON-STOP)  BOOK THIS FARE WITH T W A  LINK TO WEB SPECIALS

| FLIGHT # | | CITY | DATE | TIME |
|---|---|---|---|---|
| TWA 708 | DEPARTING | DENVER, CO | 19 AUG 98 | 7:30 AM |
| | ARRIVING | LOS ANGELES, CA | 19 AUG 98 | 9:58 AM |
| TWA 1282 | DEPARTING | DENVER, CO | 26 AUG 98 | 10:01 AM |
| | ARRIVING | LOS ANGELES, CA | 26 AUG 98 | 12:28 PM |

SEARCH AGAIN: ⊙ CLOSEST TIME TO QUERY  ○ LOWEST COST  ○ CLOSEST TO YOUR DESTINATION CITY
○ CLOSEST TO YOUR DEPARTURE CITY  ○ ALPHABETICAL

PERFORM ANOTHER SEARCH

FIG. 10

OPTION 1: IF YOU WOULD LIKE US TO CREATE AN ACCOUNT FOR YOU CLICK HERE IF YOU DON'T HAVE AN ACCOUNT WITH THIS AIRLINE.

| Create Account For Me. |

OPTION 2: IF YOU ALREADY HAVE AN ACCOUNT

* LOGIN     PASSWORD     PIN     FREQUENT FLYER NUMBER

| Use this information for my account. |

FIG. 12

WE NEED THE FOLLOWING INFORMATION FOR THESE NEW SITES:

NEIGHBOR PREFERENCE: QUIET AND NON-INTRUSIVE

ESTIMATED NUMBER OF BAGS: 1

| Continue |

FIG. 13

DISCLAIMER:

WE'RE ABOUT TO SET UP YOUR ACCOUNT:

(SHOW WHAT WE'RE GOING TO DO)

| Continue |

FIG. 14

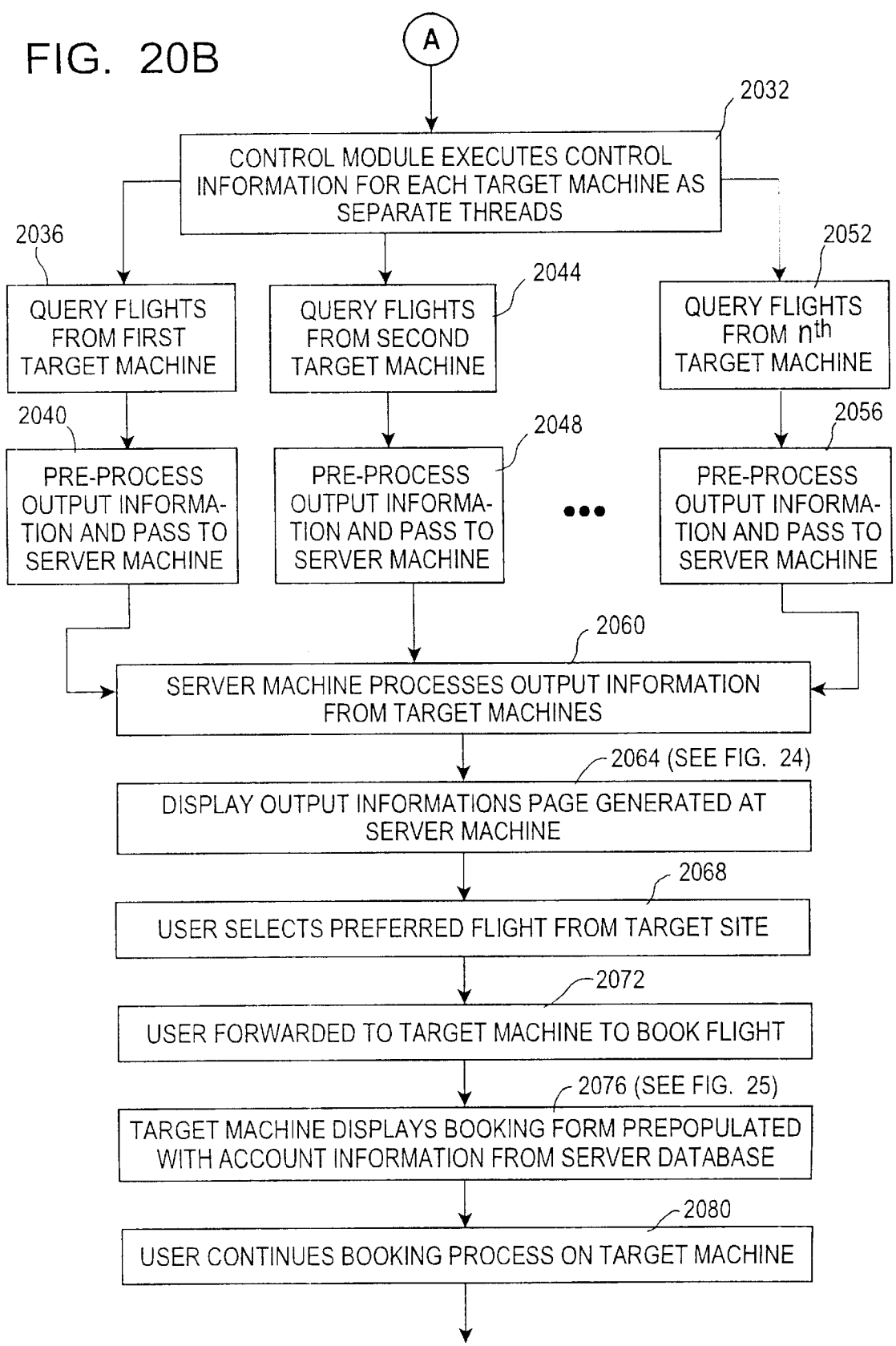

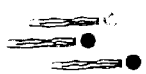
IntelliTRIP
by TheTrip.com

A Thank You to our IntelliTrip Users:
We have just completed our "proof of concept" testing for IntelliTrip — and it was a major success. Finally there's a tool for you, the consumer, that allows you to simultaneously search travel sites to find the lowest airfares in as little as 90 seconds.

Three travel Web sites included in our initial launch have asked to be removed from the service. What does that say about them? They don't want you to compare their airfares against other travel Web sites. ITN and TheTrip.com, however, will continue to participate.

Watch for major enhancements to IntelliTrip in the next few weeks that provide you more choices when it's time to book your travel. IntelliTrip pioneered revolutionary agent technology for travel on the Internet, and will continue to change the way consumers think about travel.

New users: if you complete our user profile, you will automatically receive e-mail notification of our enhancements.

Please Log In

Please log in below to use IntelliTrip. If you are not yet a member of IntelliTrip, please login name and desired password, and your correct email address below.

FIG. 21

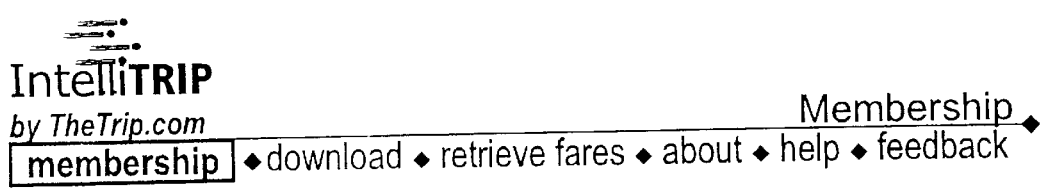

IntelliTRIP
by TheTrip.com
Membership
[membership] ◆ download ◆ retrieve fares ◆ about ◆ help ◆ feedback

WELCOME, JOHN!

AS A MEMBER OF INTELLITRIP, YOU'LL ONLY HAVE TO REMEMBER ONE LOGIN NAME AND PASSWORD FOR ALL YOUR ONLINE TRAVEL NEEDS. WHEN YOU'RE READY, CLICK ON THE "CREATE MY INTELLITRIP ACCOUNT" BUTTON AT THE BOTTOM OF THE PAGE. (NOTE: BE SURE NOT TO DELETE OR LEAVE BLANK ANY REQUIRED FIELDS IN BOLD, BLACK TYPE.)

Name and Address

FIRST NAME: [ ]  — 2200
MIDDLE INITIAL (OPTIONAL): [ ]
LAST NAME: [ ]
ADDRESS: [ ]
CITY: [ ]
STATE OR PROVINCE: [ ]
POSTAL OR ZIP CODE: [ ]
COUNTRY: [USA]

Contact Information

COMPANY NAME (OPTIONAL): [ ]  — 2204
BUSINESS PHONE: [ ]
BUSINESS FAX (OPTIONAL): [ ]
PRIMARY EMAIL: [ ]
HOME PHONE: [ ]
SECONDARY EMAIL (OPTIONAL): [ ]
CONTACT PREFERENCE: [PRIMARY E-MAIL]

FIG. 22A

Miscellaneous

I TRAVEL PRIMARILY FOR:  ◯ BUSINESS  ◯ PLEASURE  ◯ BOTH

OCCASIONALLY, THETRIP.COM OR
ITS PARTNERS WILL OFFER SPECIAL — 2212
PROMOTIONS BY E-MAIL.

I'D LIKE TO RECEIVE THIS E-MAIL  ⦿ YES  ◯ NO

PASSWORD PROTECTION:
PLEASE ENTER THE LAST 5 DIGITS OF YOUR SOCIAL SECURITY NUMBER, DRIVER'S LICENSE OR PASSPORT. THIS WILL ALLOW YOU TO RETRIEVE YOUR PASSWORD IN THE EVENT YOU FORGET IT.

[        ] [ SOCIAL SECURITY NUMBER ▼ ]

Established Accounts?

IMPORTANT NOTE: IF YOU'VE ALREADY SIGNED UP WITH ANY OF THE TRAVEL SITES SHOWN BELOW, ENTER YOUR USERNAMES AND PASSWORDS SO THAT WE DON'T CREATE DUPLICATE ACCOUNTS FOR YOU. (IF YOU'RE NOT SURE OF YOUR USERNAMES/PASSWORDS, CLICK ON THE NAME OF THE SITE TO REQUEST THAT INFOMRATION.)

| SITE | USERNAME | PASSWORD |
|---|---|---|
| INTERNET TRAVEL NETWORK (ITN) | [        ] | [        ] |

— 2208

[ CREATE MY IntelliTrip ACCOUNT ]   [ START OVER ]

FIG. 22B

IntelliTRIP
*by TheTrip.com*                                   Retrieve Fares
membership ◆ download ◆ |retrieve fares| ◆ about ◆ help ◆ feedback

PLANNING A FLIGHT:    | ROUND TRIP |   ONE WAY ← 2300

| PLEASE CHOOSE THE TRAVEL SERVICES TO SEARCH |

☑ THETRIP.COM
☑ INTERNET TRAVEL NETWORK

| DEPARTING CITY | DEPARTURE DATE & TIME |

| DENVER |    OCT ▼  29 ▼  AT  3 ▼  pm ▼

| ARRIVING CITY | RETURN DATE & TIME |

| COLORADO SPRINGS |    NOV ▼  3 ▼  AT  10 ▼  am ▼

ENTER ONLY CITIES OR AIRPORT CODES FOUND ON THIS LIST.

| NUMBER OF PASSENGERS |

| 1 ▼ |

| MAXIMUM WAIT TIME |

| I HAVE A FEW MINUTES (2.5 MINS)    ▼ |

FIG. 23

IntelliTRIP
*by TheTrip.com*

FIG. 24

Retrieve Fares membership ◆ download ◆ | retrieve fares | ◆ about ◆ help ◆ feedback

RESULTS FROM YOUR INTELLITRIP AGENT

YOUR INTELLITRIP AGENT HAS RETURNED THE LOWEST FARES IT COULD IDENTIFY ON EACH TRAVEL SITE, BASED ON THE TRIP INFORMATION YOU PROVIDED. YOU MAY BOOK YOUR TICKET (OR FIND OUT MORE ABOUT THE FARE) BY CLICKING ON ONE OF THE BUTTONS ENTITLED "BOOK THIS FARE WITH ... "

IMPORTANT LEGAL NOTICE: SELECTING ONE OF THE "BOOK THIS FARE ..." BUTTONS WILL SEND YOU TO THE INTERNET TRAVEL SITE THAT OFFERED THAT FARE. YOUR RESERVATION WILL THEN BE PROCESSED BY THAT TRAVEL SITE, NOT INTELLITRIP. ANY FURTHER COMMUNICATION ABOUT YOUR RESERVATION, ANY REFUNDS, EXCHANGES OR CREDITS SHOULD BE ADDRESSED TO THE CUSTOMER SUPPORT DEPARTMENT AT THE INTERNET SITE WHICH OFFERED THE TICKET. INTELLITRIP MAKES NO REPRESENTATIONS OR WARRANTIES WHATSOEVER WITH REGARD TO YOUR RESERVATION, ITS FULFILLMENT, OR ANY REFUNDS, EXCHANGES OR CREDITS.

| ITINERARY | |
|---|---|
| www.thetrip.com | Book this Fare with TheTrip.Com |
| Total Cost: $244.00 for 1 passenger(s) *(non-stop)* | |

TheTrip.com is the leading online travel service focused on business travelers.

| Flight # | | City | Date | Time |
|---|---|---|---|---|
| United Airlines 5571 | Departing | DEN | Oct 29 | 2:40 pm |
| | Arriving | COS | Oct 29 | 3:17 pm |
| United Airlines 1146 | Departing | COS | Nov 03 | 10:05 am |
| | Arriving | DEN | Nov 03 | 10:45 am |

| ITINERARY | |
|---|---|
| www.itn.com | Book this Fare with ITN.Com |
| Total Cost: $244.00 for 1 passenger(s) *(non-stop)* | |

Internet Travel Network is a full-service travel site for all travelers.

| Flight # | | City | Date | Time |
|---|---|---|---|---|
| United Airlines 5571 | Departing | DEN | Oct 29 | 2:40 pm |
| | Arriving | COS | Oct 29 | 3:17 pm |
| United Airlines 5568 | Departing | COS | Nov 03 | 8:00 am |
| | Arriving | DEN | Nov 03 | 8:38 am |

Reservation/Booking Request Form

IF YOU ARE GOING TO BOOK AIR IN ADDITION TO A HOTEL ROOM OR CAR, IT IS RECOMMENDED THAT YOU MAKE YOUR AIRLINE RESERVATION FIRST, FOLLOWED BY HOTEL AND CAR BOOKINGS. ADDING OR CHANGING AN AIRLINE RESERVATION WILL DELETE YOUR CAR OR HOTEL BOOKING INFORMATION.

| DENVER (DEN) TO COLORADO SPRINGS (COS) | | | THURSDAY, OCT 29 |
|---|---|---|---|
| MODIFY | UNITED AIRLINES 5571<br>EQUIP. JET<br>ADD A CAR?<br>ADD A HOTEL? | OCT 29  2:40 PM   DEPART DEN<br>OCT 29  3:17 PM   ARRIVE COS | |
| COLORADO SPRINGS (COS) TO DENVER (DEN) | | | TUESDAY, NOV 3 |
| | UNITED AIRLINES 1146<br>EQUIP. 737<br>ADD A CAR?<br>ADD A HOTEL? | NOV 03  10:05 AM  DEPART COS<br>NOV 03  10:45 AM  ARRIVE DEN | |
| | | TOTAL AIRFARE (INCLUDING TAXES) | USD  244.00 |

FLIGHT SEGMENTS MUST BE TICKETED BY CLOSE OF BUSINESS ON OCTOBER 21.
PENALTY/DEPOSIT: TICKETS ARE NON-REFUNDABLE - OR - A SERVICE CHARGE OF 75.00 USD WILL BE ASSESSED FOR ITINERARY CHANGES WITH OR WITHOUT TICKET REISSUE.

INTERNATIONAL TICKETS WILL BE CHARGED A $10 PROCESSING FEE PER TICKET, AND INCLUDE A LOW-FARE GUARANTEE. CLICK HERE FOR DETAILS.

PRICES ARE GUARANTEED ONLY AT TIME OF PURCHASE; RESERVED FARES AND UNTICKETED ITINERARIES MAY NOT REFLECT FINAL TICKET PRICES.
HINTS ON FINDING THE LOWEST FARES

PASSENGER INFORMATION (PLEASE COMPLETE FOR EACH PERSON TRAVELING):

| FIRST NAME | LAST NAME | MEAL REQUEST |
|---|---|---|
| FRED | SIMPSON | STANDARD |

THETRIP.COM CONTACT REQUEST
WOULD YOU LIKE THETRIP.COM TO CONTACT YOU BEFORE ISSUING YOUR TICKET?
  ◉ YES   ○ NO

HOTEL RESERVATION REQUEST
WOULD YOU LIKE TO MAKE A HOTEL RESERVATION FOR A HOTEL NOT CURRENTLY FOUND IN OUR DATABASE? IF SO, PLEASE ENTER THE HOTEL NAME AND ANY RELATED INFORMATION (E.G., ANY DISCOUNTS/RATES YOU MAY BE ELIGIBLE FOR, SPECIAL REQUESTS) BELOW:
  ○ YES   ◉ NO

FIG. 25

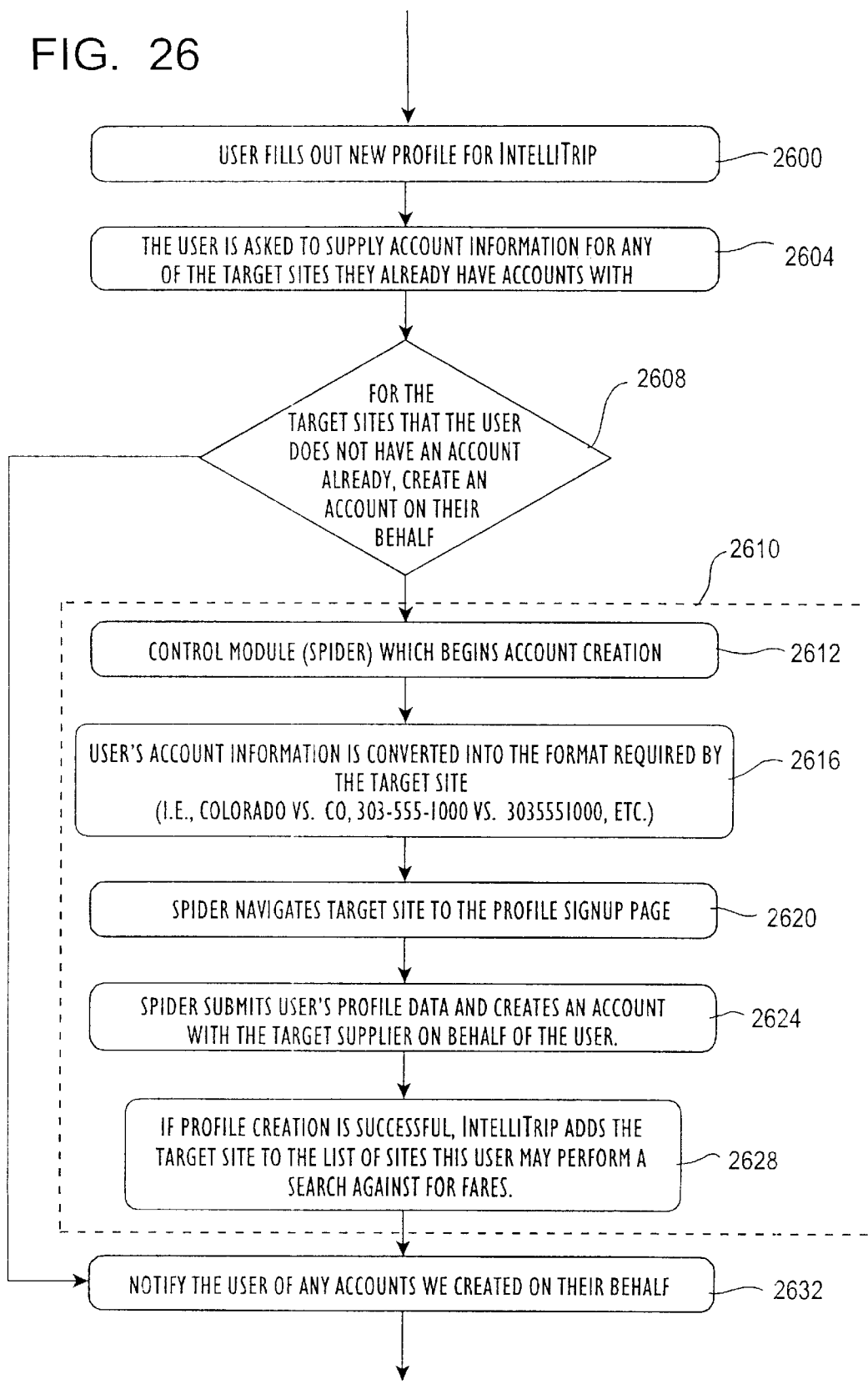

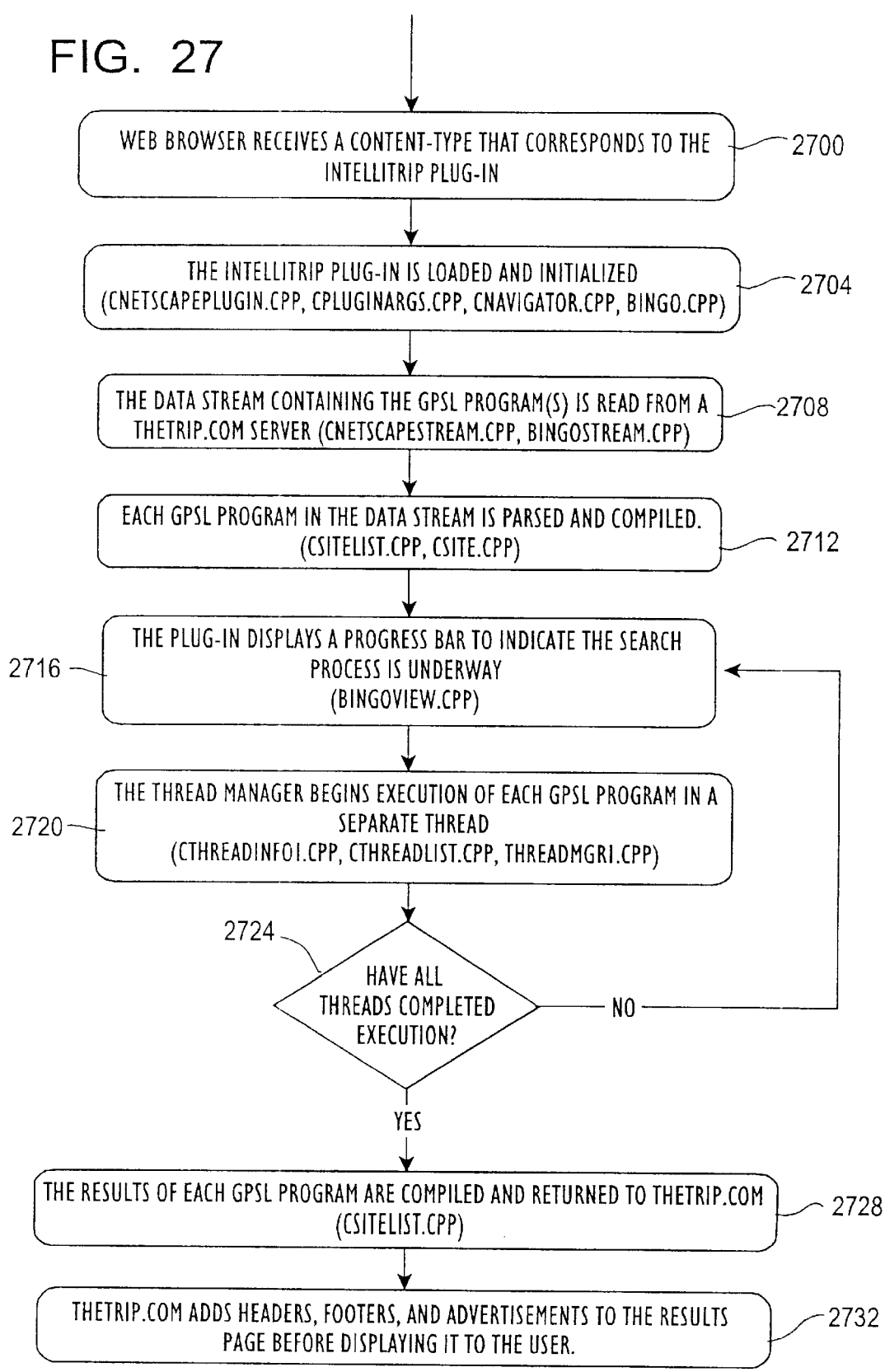

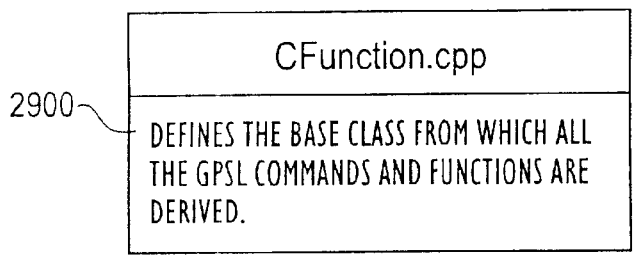
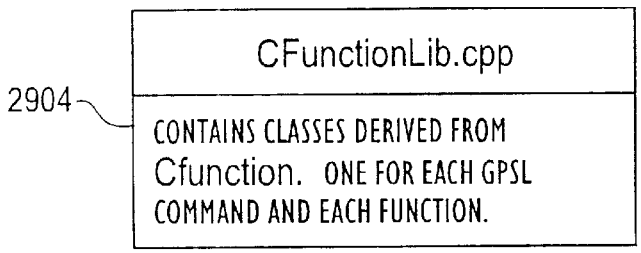
GPSL LANGUAGE CORE
C++ OBJECTS WHICH REPRESENT THE NATIVE IMPLEMENTATION OF GPSL
FIG. 29
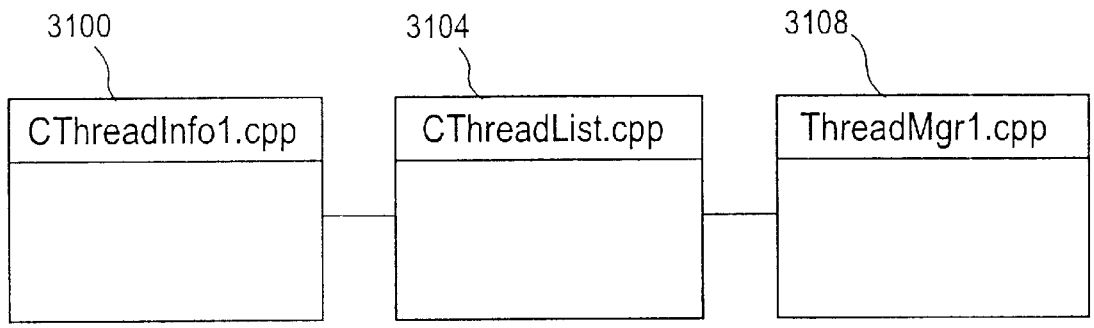
THREAD MANAGER
MANAGES SIMULTANEOUS EXECUTION OF MULTIPLE COMPILED GPSL
PROGRAMS IN A MULTI-THREADED FASHION.
FIG. 31

OBTAINING AND UTILIZING COMMERCIAL INFORMATION

This application is related to and claims priority from Provisional Patent Application No. 60/106,423, filed Oct. 30, 1998.

This application contains a microfiche appendix consisting of 3 microfiche sheets and 150 frames.

FIELD OF THE INVENTION

The present invention relates to commercial information processing, and in particular, to an apparatus and method for obtaining and utilizing commercial information from communication networks.

BACKGROUND OF THE INVENTION

Systems of various configurations are known for obtaining reservation information related to airline flights, lodging, transportation, and the like. Examples of ways to obtain this information include retail travel agencies, travel agency web sites and airline web sites. However, the current methods for obtaining reservation information have many disadvantages.

Conventional travel agencies obtain reservation information from computer terminals which interface to a central reservation system (CRS). By entering cryptic strings into a command line on the computer terminal, an agent can determine the available reservations and book a reservation for a customer. The CRS serves as a clearing house for reservations from many reservation providers. Examples of CRS services include Apollo™ and Sabre™.

Reservations providers maintain systems which communicate with the CRS. For example, an airline has a system which tracks the available seats and the seats that have been reserved. When additional seats become available, the airline system is updated first whereafter the CRS is updated so that travel agencies can reserve these seats for their customers using the updated information in the CRS. Conversely, the CRS notifies the airlines when reservations are made by customers so that they are not also made available to others. In this way, the airlines can effectively market reservations for their seats.

Operation of the travel agencies and CRS services are costly. Customers, in effect, pay the travel agencies for their services because the quoted price of the reservation is inflated by an 8–10% commission. The commission is paid to travel agencies from the profits of the reservation providers. Additionally, reservation providers pay the CRS for providing their service. A fee is paid to the CRS for including a provider's reservations in the system and for each leg of flight booked with that reservation provider. As can be appreciated the cost of the CRS to the airline is paid by the customer in the form or higher prices. So indirectly, compensation is paid to the travel agencies and the CRS by the customer.

The CRS stores reservation information from many, but not all, reservation providers. For example, most airlines provide reservation information to the CRS, but some low cost and smaller airlines do not, in order to reduce costs. Additionally, some reservation providers who participate in the CRS also market some reservations outside the CRS. These reservations may be distressed inventory and be subject to additional restrictions. Since these reservations do not have the additional cost of the CRS and travel agencies, they are typically sold at discounted rates. The reservations not available to the CRS are collectively referred to "web-only" fares. Accordingly, there is a need to provide customers and travel agents web-only reservation information which is not available from the CRS.

The travel agency method for booking a reservation with a CRS is inefficient. For a customer to make a reservation, it must be first communicated from the customer to the travel agency, next from the travel agency to the CRS and finally from the CRS to the reservation provider. Conversely, the accepted reservation must be passed first from the reservation provider to the CRS, next from CRS to the travel agency and finally from the travel agency to the customer. The information chain in which the reservation travels is inefficient and slow. Additionally, the CRS service and travel agency computers must be purchased and maintained for the system to operate properly.

The systems of reservation providers maintain the most current status of their reservations. As those skilled in the art can appreciate, it would be more efficient to only maintain the reservation in a single location. However, the reservation information is replicated in at least the multiple CRS services. To provide reservation information to the CRS, the reservation providers must create specialized software which interfaces their systems with the CRS services. It is desirable for reservation providers to only maintain reservation information on only one system in which all marketing methods may interface to determine the current status of reservations.

With the advent of global computer networks (e.g., the Internet), some travel agencies have replaced the travel agents with web sites. The web sites allow the customer to make queries to the CRS without knowing any of the complex commands previously required. By eliminating the complex interface to the CRS, customers are able to obtain reservations without the assistance of a travel agent. These sites communicate with the CRS which communicates with the reservation providers, in the conventional manner, to book a reservation.

Reservation providers, such as airlines, have also taken advantage of the Internet to market their reservations. A customer can directly book a flight with a reservation provider and avoid the travel agencies and possibly the CRS. The direct booking systems of the reservation providers may or may not be interfaced to the CRS services. Preferably, the reservation providers do not book direct sales through a CRS such that the associated fees are avoided. Further, reservation providers prefer direct sales because reservations are typically not discounted even though the travel agent commission and any CRS fees may be avoided. These savings bolster the profit of the reservation providers.

Customers are typically at a price disadvantage when booking a reservation directly from a reservation provider. With direct sales, it is difficult to determine the cheapest fare because it is difficult to aggregate the fares. To compare prices, the customer must visit many reservation providers and correlate the results themselves in order to determine the best price. This process of comparing prices is time consuming because the web sites for each reservation provider presents their content in an inconsistent way. The CRS is useful in this circumstance because it allows sorting results from many reservation providers based upon predetermined criteria, such as price. Additionally, utilizing a travel agency to book reservations is typically no more costly to the customer than booking directly from the reservation provider. Accordingly, customers see little advantage to using the web sites of reservation providers (or other direct marketing methods) to book reservations from the CRS. However, it is noted once again, web-only fares are not available through the CRS.

As mentioned above, fares not available through CRS services are provided to customers directly. These web-only fares are available by accessing a reservation provider's web site and are not generally included as part of the CRS. For example, each of the major airlines have recently begun offering web-only fares on their web sites. Additionally, consolidators and other providers of discounted reservations have web sites that offer web-only fares. These web-only fares are typically distressed inventory with additional restrictions. Obtaining these fares is inconvenient to the customer since she has to visit a number of these sites in succession to compare prices (or other criteria) before booking. Comparisons made in this way are time and labor intensive.

Others have recognized the need to compare products or services on the Internet. However, these systems do not address the unique particularities of obtaining and booking reservation information and similar services.

In summary, it appears desirable to develop a system which: (1) decreases the transaction costs and eliminates steps associated with booking a reservation, (2) provides reservation information not available to the CRS, (3) reduces the burden on reservation providers associated with marketing their reservations, and (4) allows comparison of web-only reservation information from a number of reservation providers.

SUMMARY OF THE INVENTION

In accordance with the present invention, a method for providing reservation information related to airline flights, lodging, transportation and the like using a communications network is disclosed. In one embodiment, access to a server machine is divided into sessions. During a first session a user machine makes a first request for reservation information from the server machine. This first request includes input data from a first customer which relates to the desired reservation information. For example, the first customer may input travel times in the hopes of booking a flight which corresponds to those times. The server machine requests the reservation information from a number of target sites based upon the input data. Included in the number of target sites is a first and second target sites. The server machine obtains reservation information which includes first and second reservation information respectively from the first and second target sites. Processing software manipulates the reservation information to provide processed reservation information to the user machine. On the user machine, the processed reservation information is presented to the first customer. In this way, the customer's input data results in processed reservation information being presented to the first customer from a number of target sites.

Relatedly, a server machine for providing processed reservation information to a user machine is disclosed. The processed reservation information is distilled from reservation information obtained from at least a first target site of a number of target sites. The server machine includes a memory subsystem and a processing hardware. Stored in the memory subsystem is customer information which includes first customer information. The first customer information is related to a first session in which reservation information is sought by the user machine. Stored in the memory subsystem is customer information which includes the first customer information. The processing hardware communicates with the memory subsystem that receives a first request for reservation information during the first session. Included in the first request is customer input data from the user machine. The processing hardware formats the customer input data into a first format and relays that information to the first target site. The processing hardware also obtains first reservation information from the first reservation information site and processes the first reservation information to produce processed reservation information. The user machine is provided the processed reservation information. The processing hardware also stores customer information related to a reservation booking by the first customer based upon the first reservation information.

In another embodiment, a method for providing determined information is disclosed. A server machine is accessed by a first user machine. A number of information items are input to the server machine by the first user machine. Additionally, first and second input information are respectively formatted into a first and second formats using the number of informational items. The first input information is used to obtain first output information from a first target site. Similarly, the second input information is used to obtain second output information from a second target site. The obtaining of the first and second output information occurs, at least partially, at the same time. The first and second output information are processed. By using each of said first and second output information, determined information is provided.

Based upon the foregoing summary, a number of important advantages of the present invention are readily discerned. Reservation information can be obtained without needing a CRS or travel agency. Reservation information on target machines, which is not normally part of the CRS, is available to consumers in a way that makes meaningful comparison between a number of target machines possible. The burden on reservation providers is not increased because the server machine uses an unmodified target site to obtain this information.

Additional advantages of the present invention will become readily apparent from the following discussion, particularly when taken together with the accompanying drawings.

BRIEF DESCRIPTION OF THE DRAWINGS

FIG. 6 is a hardcopy of a web page in which the user enters information which is used to create an account profile;

FIG. 7 is a hardcopy of another web page in which the user enters additional profile information;

FIG. 8 is a hardcopy of a web page which allows the user to enter flight information;

FIG. 10 is a hardcopy of a web page in which search results are displayed for a number of airlines;

FIG. 12 is a hardcopy of a web page which allows the user to either create an account on the target machine or log into an existing account;

FIG. 13 is a hardcopy of a web page in which the user may provide additional information requested by the target machine as part of the booking process;

FIG. 14 is a hardcopy of a web page in which the user is provided a disclaimer related to creation of an account with the target machine;

FIG. 20B is a second portion of the flow diagram of FIG. 20A;

FIG. 21 is a hardcopy of a web page in which the user enters their name and password before logging into a server machine;

FIG. 22 is a hardcopy of a web page in which a new user enters their account information so that the server machine can setup a new account;

FIG. 23 is a hardcopy of a web page in which the user enters travel parameters for a desired flight;

FIG. 24 is a hardcopy of a web page in which the server machine displays results of a search instigated for a desired flight;

FIGS. 25 is a hardcopy of a web page in which the user interacts with the target machine to complete booking the flight;

FIG. 26 is a flow diagram showing the process by which a new user enters account information into the server machine so that accounts on the target machines may be created;

FIGS. 27 is a flow diagram in which the loading and execution of the control module is described;

FIG. 29 is a block diagram representation of a portion of the control module which includes the native implementation of the control information (or general purpose spider language, "GPSL") core;

FIG. 31 is a block diagram representation of a portion of the control module which includes thread management of the virtual machines;

DETAILED DESCRIPTION

Figure 1:
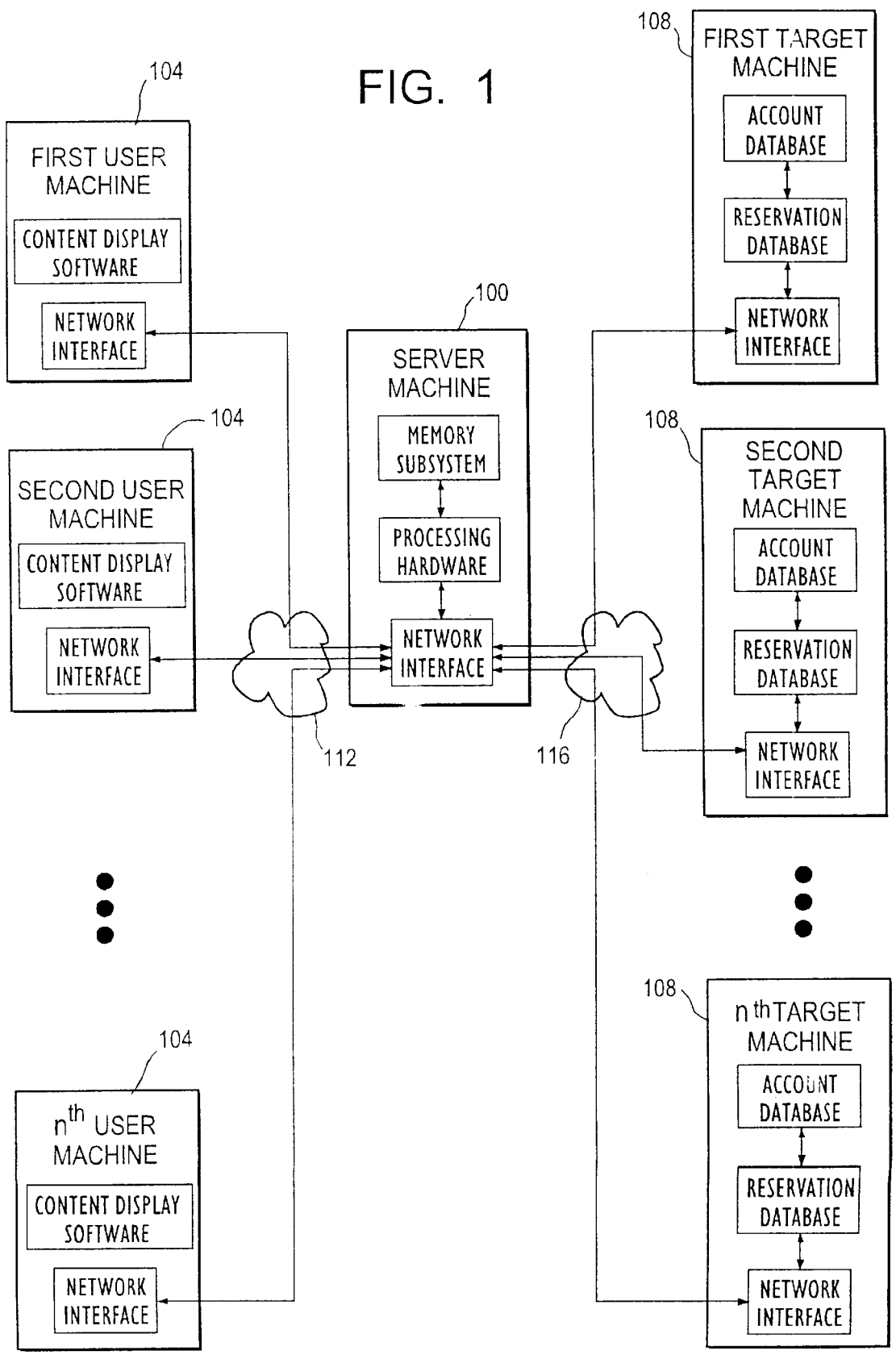
FIG. 1 is a block diagram which schematically depicts an embodiment of an automated commercial information system.

With reference to FIG. 1, an embodiment of a commercial information system is shown in block diagram form. The commercial information system includes a number of user machines 104, a server machine 100, a number of target machines 108, and one or more communication networks 112, 116. Communication between the machines 100, 104, 108 occurs on a network(s) 112, 116. The two communication networks 112, 116 could be unified into a global computer network such as the Internet. By using the Internet the various machines can be separated by great distances, and still communicate effectively. In this embodiment the user machine 104 obtains reservation information from the target machines 108 by way of the server machine 100. Reservation information is defined herein to include reservations, bookings, and purchases of things. The reservation information could be for such things as flights, rental cars, hotels, etc.

The user machines 104 contain content display software such as a web browser, a network interface, one or more processors, volatile and non-volatile memory, etc. The content display software presents information to the user. The information presented may be wholly or in part derived from the server machine 100. Using a mouse, keyboard or other input device, the user can interact with the information supplied by the content display software. The network interface could be a plain old telephone system (POTS) modem, frame relay, cable modem, Ethernet card, or any other wired or wireless method for connecting to a network.

The user machine 104, and computers in general, contain volatile and non-volatile memory. Examples of volatile memory include semiconductor random access memory and are characterized by losing any stored information when power is removed from the machine. Alternatively, non-volatile memory retains stored information when power is removed and includes such things as magnetic based media. While executing, the software is typically read from the non-volatile memory and placed in the volatile memory.

The server machine 100 is a specialized system which controls the commercial information system. Included in the server machine 100 is a network interface, processing hardware, a memory subsystem, and other computer hardware. The network interface allows connection to the user machines 104 and the target machines 108 by way of one or more networks 112, 116. The processing hardware may have one or more processors and other processing circuits. Included, in the memory subsystem is volatile and/or non-volatile memory. Typically, a portion of the requests made of the server machine 100 by the user machine 104 are reformatted and relayed to the target machines 108. Conversely, response information from the target machines 108 is formatted by the server machine 100 and passed, at least in-part, to the requesting user machine 104.

The target machines 108 are a repository of commercial information which is generally available to users on the network 112, 116. In one embodiment, the target machines 108 are each a repository of reservation information where each machine 108 generally contains different reservation information. Included in the target machines 108 is an account database, a reservation database, a network interface, and other items. Typically, the target machines 108 are designed to communicate with user machines 104 without any intervention from the server machine 100. The target machines 108 market services or products, the availability and reservation of which is stored in the reservation database. A user connected to the target machine 108 via the network interface searches the reservation database, enters account information particular to that user, and reserves or purchases the product or service. If the user is interested in the product or service offered at each target machine, the user must search each target machine 108 separately before making a reservation or purchase. Each target machine 108 has unique interaction required to search and purchase and the product information is presented in unique ways. For example, content of the web pages is different, navigation through the web pages is different and any reservation information is presented differently. Accordingly, to comparison shop the target machines for reservation information is a labor and time intensive process.

Figure 2:
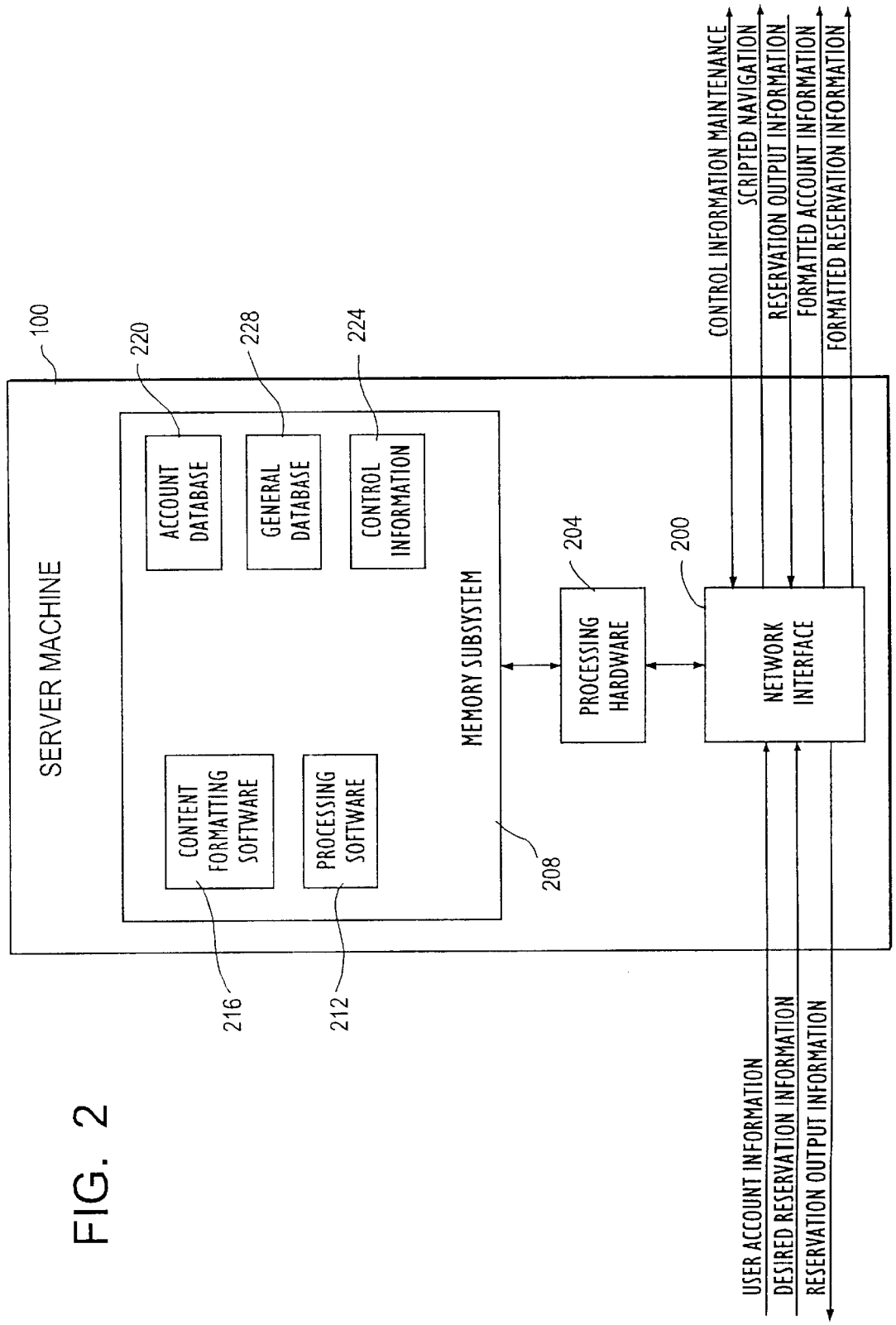
FIG. 2 is a block diagram representation of a server machine.

With reference to FIG. 2, an embodiment of a server machine 100 is shown in greater detail. The server machine 100 includes a network interface 200, processing hardware 204, and a memory subsystem 208. The memory subsystem which may have both volatile and non-volatile memory includes processing software 212, content formatting software 216, an account database 220, control information 224, a general database 228, and other software and data. The processing hardware 204 is generally described in relation to FIG. 1 above.

Figures 9, 11:
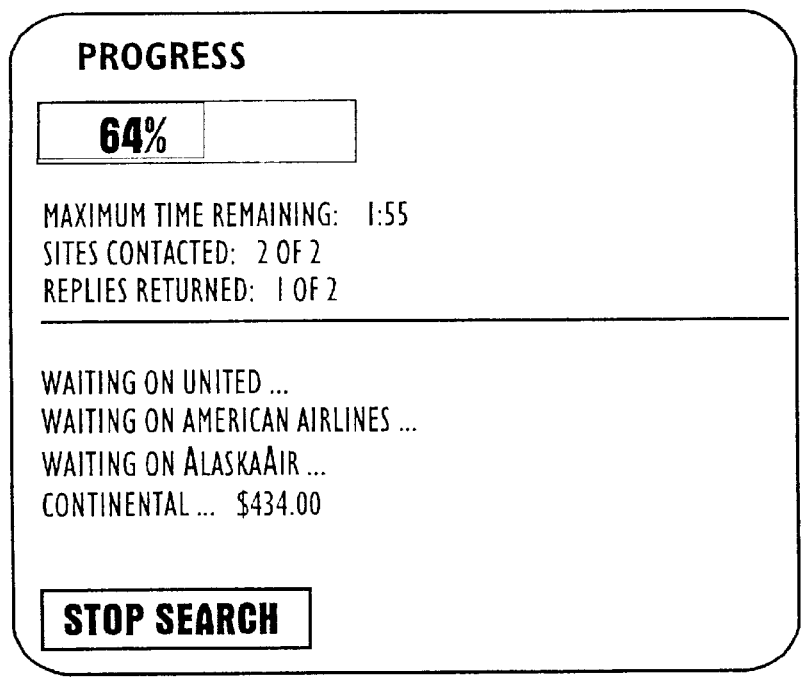
FIG. 9 is a hardcopy of a web page which displays the progress of a search for flight information.
FIG. 11 is a hardcopy of a web page in which detailed information needed for booking a flight is requested.

The network interface 200 serves as a conduit of information to and from the user and target machines 104, 108. For example, a message is sent to the content display software on the user machine 104 requesting user account information. An example account information form is shown in FIG. 11. After entry by the user, the server machine 100 receives the account information which includes the user's identity, address and billing particulars and other preferences. The account information received from the user is a superset of the account information required by each target machine 108. In other words, the server machine account database 220 stores everything any target machine account database might need. Account information received by the server machine 100 is formatted according to the particular requirements of each target machine 108 and used to create accounts on the target machines 108, when necessary. Predetermined navigation scripts are used to automatedly interact with each target machine 108 to accomplish the account creation process.

Obtaining reservation or purchasing information is also managed by the server machine 100. The user or customer inputs data into a form prepared by the server machine 100 and presented by the content display software on the user machine 104. An example form is shown in FIG. 8. The desired reservation or purchase information may be entered in this way. After receiving the reservation information, the server machine 100 formats it according to the particulars of each target machine 108 to respectively query each reservation database. Each target machine 108 responds by outputting the reservation information to the server machine 100. The reservation information from each target machine 108 is reformatted to have a common format before presentment to the user.

The processing software 212 is the primary managing module for the server machine 100 and control system. Each of the content formatting software 216, control information 224, account database 220, and general database 228 interact with processing software 212. The processing software 212 passes all account and reservation information to the content formatting software 216 for modification into the format desired by the target or user machines 108, 104. The control information block 224 stores navigation scripts which are used by the processing software 212 to direct interaction with each target machine 108. Each target machine 108 would require different navigation scripts to perform such functions as account creation, account modification, one-way travel query, round-trip travel query, etc.

The account database 220 stores profile information unique to each user. Before booking a flight, information such as customer identity, address, preferences, and payment method are generally required by each target machine 108. The server 100 maintains the customer profile information so that future bookings may avoid reentry of this information. In this way, the user only has to create an account once on the server machine 100 so that the processing software 212 may retrieve this information from the account database 220 when needed by the target machines 108. Any other forms presented by the target machine 108 may be completely or partially filled with the information in the account database. Where only part of the form can be completed because the account database 220 is incomplete, the form can be prepopulated with known information and presented to the user for completion.

The general database 228 stores historical information such as customer input data, query output information, and error logs. Customer input data, possibly in the form of a desired reservation request, is stored in the general database 228 such that later in the current session, the user could avoid typing that information into a form again. For example, the user makes a flight inquiry for travel to Chicago on the nineteenth with United Airlines™. Later the user decides to perform another query for a flight to Chicago on the nineteenth with PanAm™ instead. In this example, the flight query form could be conveniently prepopulated with the cached information from the first query. The input data could be periodically purged from the database, for among other reasons, to conserve space in the general database 228.

Query output information is also cached in the general database 228. In some instances, the user or another user may request the same reservation information. The processing software could apply a predetermined condition to decide if the query output information is recent enough and accordingly presumed still valid. In this way, presumed valid reservation information could be presented to another user. By using cached output information, queries to the target machines 108 are reduced. Alternatively, the caching of output information can be selectively disabled if the most current or "real time" information is desired.

The general database 228 also logs any errors or other significant events which occur during processing. These other significant events could include an indication of successful completion of a query or request by the user, an indication of a successful account creation, and an indication of a successful account modification. Errors could include failures of the scripted navigation performed on the target machines 108, timeouts while interacting with either the user or target machines 104, 108, receipt of incomplete account or reservation forms, etc. The information stored in the general database assists the persons who maintain the server machine 100 and advertisers assess the operation of the server machine 100.

Figure 3:
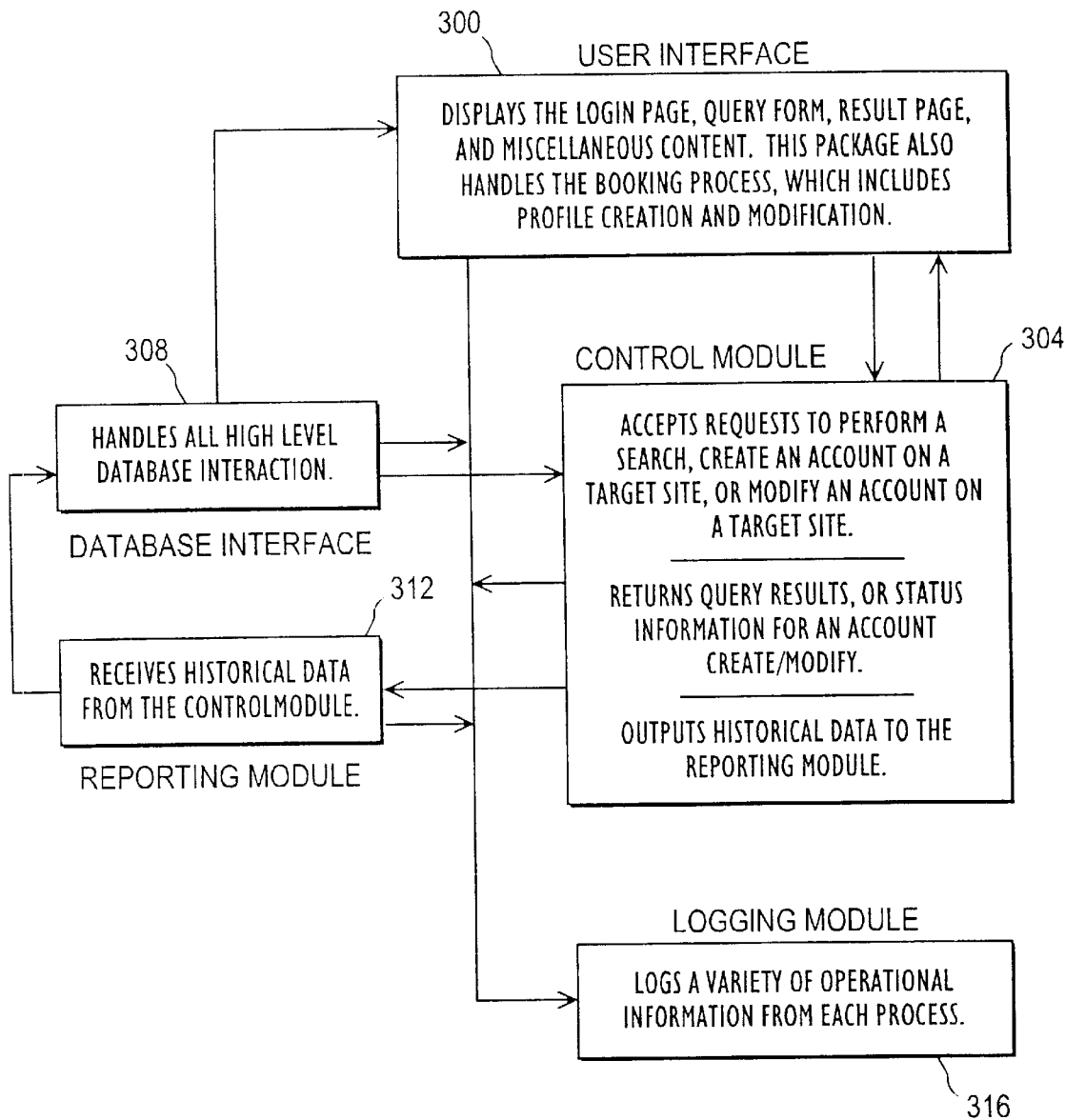
FIG. 3 is a block diagram which schematically depicts an embodiment of an automated commercial information system.

With reference to FIG. 3, an embodiment of a software program which implements the control system is illustrated. The software program may be broken down into a number of packages or sub-programs which communicate with each other. The sub-programs include a user interface 300, a control module 304, a database interface 308, a reporting module 312, and a logging module 316. The user interface 300 receives information from the database interface 308 and also communicates with the control module 304. The database interface 308 is coupled to one or more databases which store information received from the reporting and control modules 312, 304. The information in the database is provided to the user interface 300 and control module 304. Information is received from each sub-program and reported to the logging module 316.

The user interface sub-program 300 generally performs all interaction with the user. Content from the user interface 300 is supplied over the network 112 to the content display software on the user machine 104. Preferably, a commercial web browser program displays the content on the user machine 104. The user interface 300 gathers and validates a user's login information; presents search query forms to the user; gathers information from the user to create a profile and allows later modification of the profile; presents search results to the user; manages the booking process; and presents other content such as legal disclaimers, press information, title pages, navigational headers and footers, banner advertisements, help screens, customer feedback, etc. The search query function includes gathering search parameters from the user, interacting with the control module 304 to initiate the query, and sorting the results returned from the control module 304. The booking function includes determining if the user has an account at the target machine 108, creating an account at the target machine 108 when there is none, and updating the account at the target machine 108 when it differs from the account information in the server machine 100. The profile management function uses the login information to determine if the user has an account and creates the account, if necessary.

The control module 304 performs the actual queries of the target machines 108, creates the target machine accounts, maintains the accounts, returns query results and status information, and outputs historical data to the reporting module 312. Query information collected by the user interface 300 is reformatted by the control module 304 in accordance with the particular requirements of the different target machines 108. Only the target machines 108 selected through the user interface 300 are searched. Control information, in the form of JAVA™ classes or general purpose spider language ("GPSL") scripts for the selected target machines 108, is instantiated and loaded into the code (i.e., added to the code to form a coherent software program) for the control module 304. The control information describes the unique interaction or navigation a particular web site requires during account or reservation queries. As those skilled in the art can appreciate, target machines 108 are designed to directly interact with user machines 104. However, the control information allows the server machine 100 to mimic the direct interaction in order to quickly receive reservation information without the delays associated with human interaction. To further speed acquisition of reservation information, the control module 304 executes the code for each selected target machine 108 in separate threads so that the queries are substantially simultaneous. Search results returned from each target machine 108 are reformatted into a consistent format. The search query and results are provided to the reporting module 312 as historical data. If the user decides to book any of the reservations resulting from the query, a form is prepared by the user interface 300 which allows the user to book without directly interacting with the target machine 108.

The database interface 308 receives all database requests and reformats these requests before passing them to the underlying databases. In this way, changes to the underlying databases only require rewriting of the database interface code and not any of the code associated with other modules. The underlying databases store login information, the customer profile, and historical data. By using the interface 308, the control module 304 can retrieve, store and update login, customer profile, and other historical information. The historical data produced in the control module 304 and passed through the reporting module 312 may include reservation queries, query results, and status information.

The reporting module 312 supports storage, retrieval and datamining of the historical information. Included in the historical information are reservation queries, query results, and status information. Historical information is received by the reporting module 312 from the control module 300. Next, the reporting module 312 passes the historical information to the database interface 308 for storage. The reporting module 308 also supports queries to determine statistical information. For example, administrators can query to determine the lowest airline fare found between two city pairs for a given airline carrier; most commonly requested city pairs; lowest overall fare found between two city pairs; average number of requests submitted by the first customer during said first session; identity of the airline carrier most often booked for a particular city pair; and identity of an airline carrier that is selected most often overall in booking airline flights. In order to organize historical information, it is attributed to a particular session. The session begins when the user first access the server machine 100. After 30 minutes of inactivity or when the user disconnects from the server machine 100, the current session ends.

The logging module 316 provides information which allows tracking of the system operation. The login information can be stored in either a log file or a database. The sorts of things stored by the logging module include the ratio of queries that end in error versus those that are successful, average time taken to complete a query of a target machine 108, number of failed account creation/modification for a target machine 108, and number of queries served. By storing operational information in this way, administrators can refer to the log file to ascertain and diagnose problems with the system.

Figure 4A:
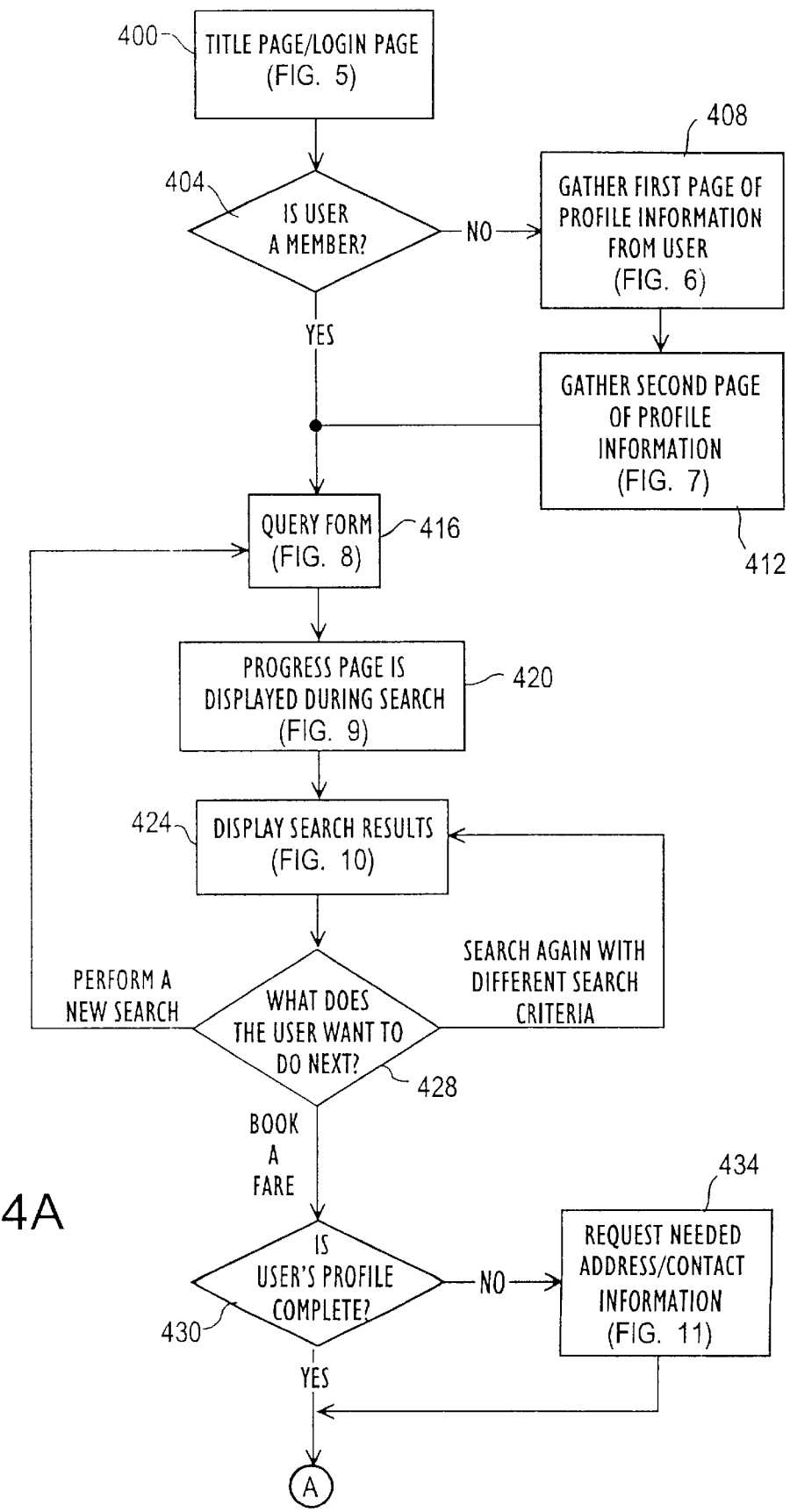
FIG. 4A is a first portion of a flow diagram which depicts the steps undertaken when an user makes a reservation in one embodiment.
Figure 4B:
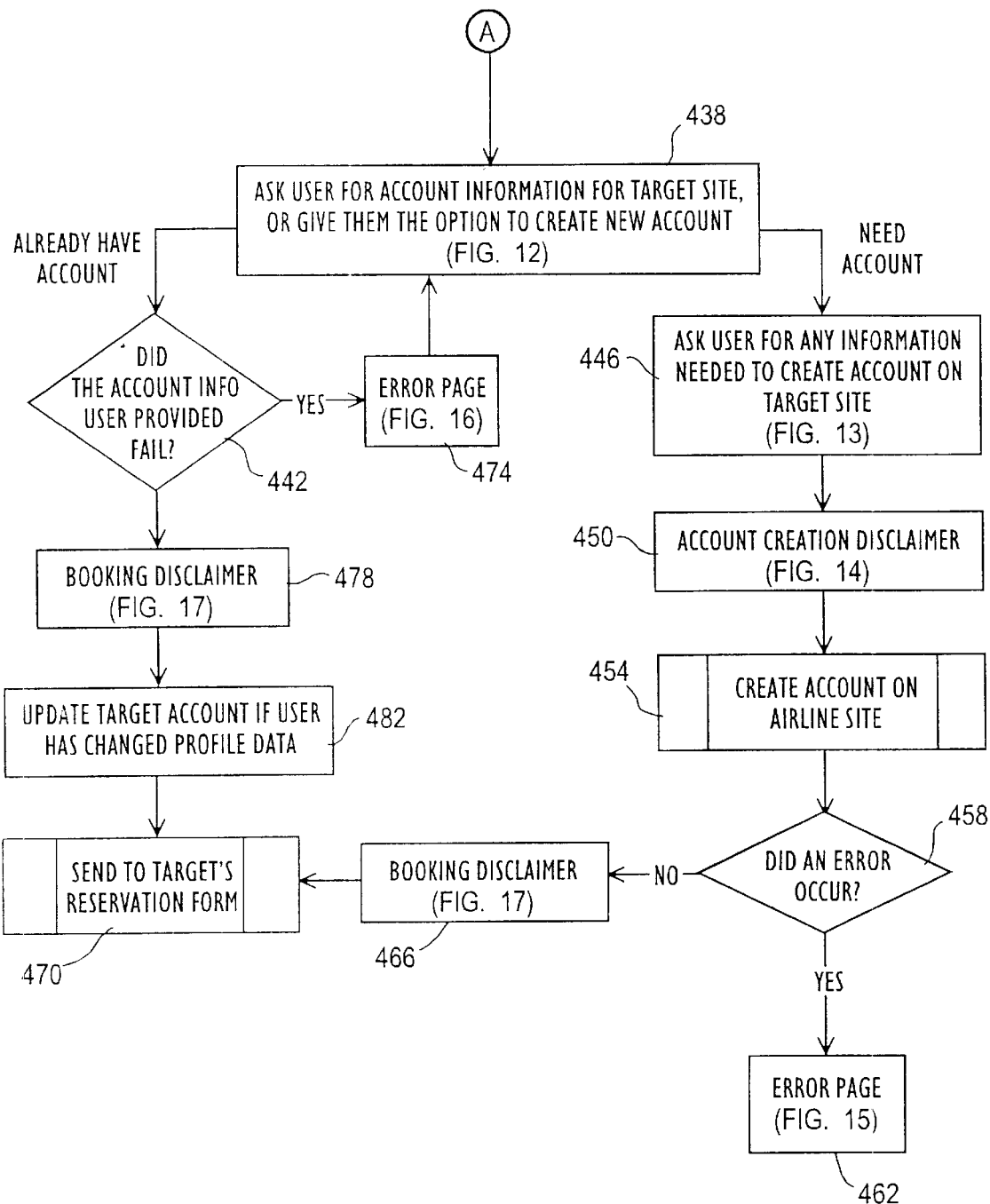
FIG. 4B is a second portion of the flow diagram of FIG. 4A.

Referring to FIGS. 4A–B, a flow diagram of the operation of an embodiment of the commercial information system is shown. The flow chart follows the pages of information prepared by the user interface 300 and presented by the content display software. Depicted are the steps encountered during creation of an account, a search for reservation information and booking of a flight.

Figure 5:
FIG. 5 is a hardcopy of a web page which allows the user to log into a server machine.

In step 400, a title and login page is presented by the content display software on the user machine 104. An example of the title and login page is shown in FIG. 5. The user interacts with this page to enter her login name and password. An option on this page allows creation of a cookie which stores the login name and password on the user machine 104. Use of a cookie to store this information allows avoiding the login process because the information can be retrieved automatically.

Once login information is received by either the user filling in the login page or from retrieval of a cookie, a determination is made as to whether the user is a member in step 404. Membership is determined by matching an existing account to the login name and password provided by the user. If the user is not a member, a profile is created in steps 408 and 412. The first profile page is shown in FIG. 6 and the second profile page is shown in FIG. 7. The profile pages contain a superset of account information required by all the selected target machines 108. Later during the booking process, this information is relayed to the target machine 104 if an account must be created.

Members are presented a flight query form in step 416. An example query form is shown in FIG. 8. Information from the account profile may be used to prepopulate this form. For example, if in step 412 (see FIG. 7) the member specified Denver as a home airport, Denver is automatically presented as the departing city in step 416 (see FIG. 8). In the flight query form, the member enters the airlines to search, departure and arriving city, times and dates of travel, number of passengers, seating class, search criteria, and search timeout. The search timeout allows the member to specify how long she is willing to wait for each target machine to respond.

After the query form is completed and submitted in step 416, the control module 304 begins the query. In step 420, a progress page is displayed for the member (see FIG. 9). Progress information such as time remaining, target machines contacted, replies returned, and each target machine status is presented to the member in this embodiment. The progress page positively states the status of the search to assure the member her query is proceeding.

When the searches are complete or the timeout is reached, a number of itineraries are shown to the member in step 424. An example of search results is shown in FIG. 10. The itineraries are sorted according to the predetermined criteria selected in step 412 (see FIG. 7). Each itinerary allows the member to find out more information about the airline or book the reservation. Additionally there is a link to web specials on the server machine 100 and any "web-only" deals associated with the target machine 108.

In step 428, the member decides what course of action to take after evaluating the search results in step 424. The member may book a desired itinerary, perform the same search with a new criteria, perform an entirely new search, or follow a link to the web specials or web-only deals. If the same search is desired with a different criteria, the member returns to step 424. However, if a completely new search is desired, the member returns to step 416.

Presuming the member chooses to book one itinerary, the process progresses to step 430 in FIG. 4B. A determination is made in step 430 to ascertain if address and contact information, required to set up an account with the target machine 108, exists in the member's profile. If the profile on the server machine 100 is lacking (i.e., if the user has never booked a flight before), the member is presented with an additional form in step 434. An example of a supplemental profile form is shown in FIG. 11. As can be appreciated, waiting until the address and contact information is actually necessary reduces the up-front administrative burden upon the user.

Once the account profiled is augmented to include address and contact information, the member indicates if an account exists on the selected target machine 108 in step 438. FIG. 12 depicts an example form which allows either entering of an existing account or beginning an account creation process. If there is no account for this member on the target machine 108, the user interface 300 directs the member to create an account by proceeding to step 446.

In step 446, any additional information not contained in the server machine profile and needed by the target machine 108 is presented in a form. An example of this form for one target machine 108 is shown in FIG. 13. Any other information contained within the server machine profile is provided automatically to the target machine 108 when necessary. This avoids burdening the member with providing redundant or unnecessary information.

Figure 15:
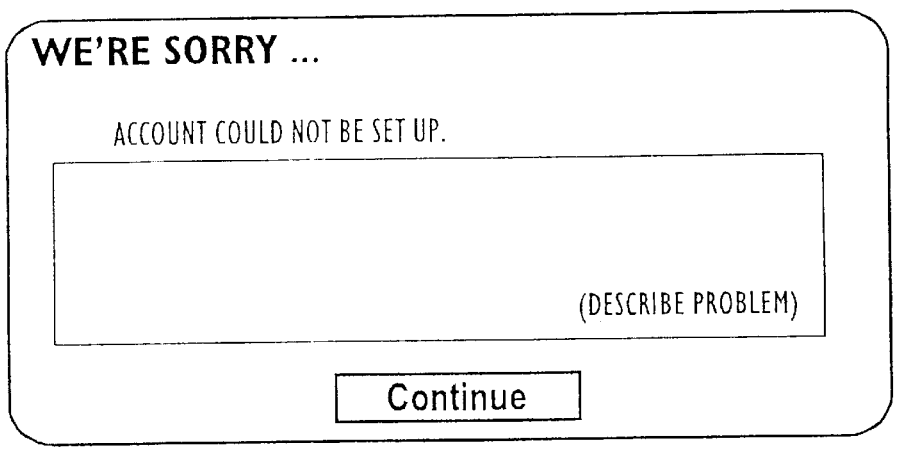
FIG. 15 is a hardcopy of a web page which can display any errors which may have occurred during creation of the account.

Before an account is created in step 450, the member is presented with a warning screen or disclaimer which notifies the member that an account is about to be created in their name. A rough example of this disclaimer is shown in FIG. 14. Once the member acknowledges the disclaimer in step 450, an account on the user machine 108 is created in step 454. If in step 458 an error is detected in the account creation process, an appropriate error message is produced in step 462. A rough example of this error message is shown in FIG. 15.

If it is determined an account was created successfully in step 458, the process continues to step 466. At step 466, all the steps for booking a reservation are finished. However, before being handed-off to the target machine 108, the member is warned of the hand-off (see FIG. 17). Presuming the member continues past the warning, the booking process continues on the target machine 108. Forms prior to the hand-off are completed by the server machine 100. Any form displayed immediately after the hand-off is prepopulated with information from the member's profile.

Figure 16:
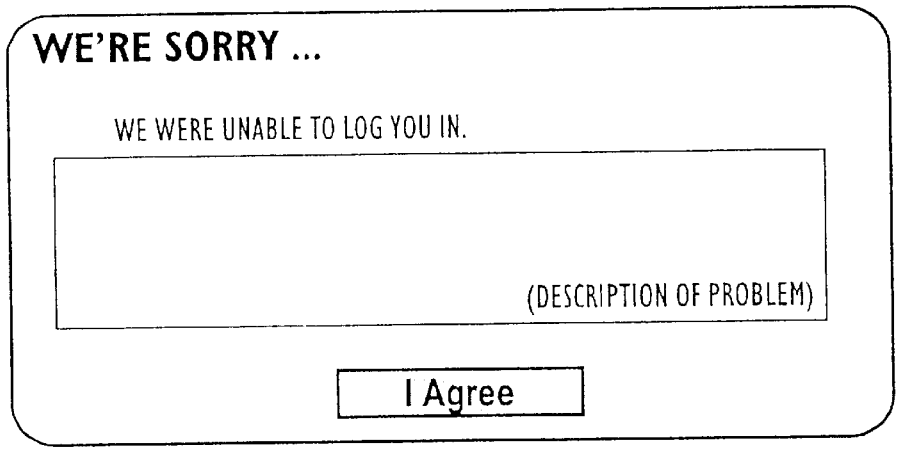
FIG. 16 is a hardcopy of a web page in which any errors are displayed which occurred during login to an existing account on the target machine.

Returning back to step 438 (see FIG. 12), the member may already have an account on the target machine 104 such that creation of a new account is unnecessary. The member may have created this account when visiting the target machine 108 on other occasions. In step 438, a member with an existing account may enter the existing account information whereupon it is verified in step 442. Verification simply entails the control module 304 presenting the existing account information and determining if the account is recognized by the target machine 108 in step 442. If existing account information is not recognized by the target machine, an appropriate message is presented in step 474 before the user interface 300 returns the member to step 438. A rough example of this message is shown in FIG. 16.

Figure 17:
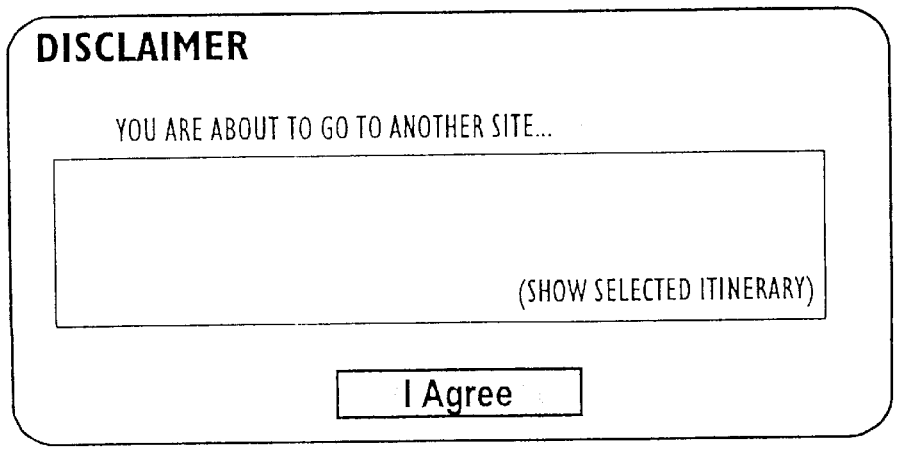
FIG. 17 is a hardcopy of a web page which notifies the user that their browser will be pointed at the target machine.

Once the member's existing account on the target machine 108 is verified, a booking disclaimer is presented in step 478. A rough example of this disclaimer is shown in FIG. 17. Once the member agrees to being sent to the target machine 108, any updated profile information is used to modify the account information on the target machine 108 in step 482. The update of the target account is performed by the server machine 100 in the background without troubling the member. After the target account is updated in step 482, the member is handed-off to the target machine to continue the booking process. The first page presented by the target machine 108 can be prepopulated by the server machine 100.

Figure 18:
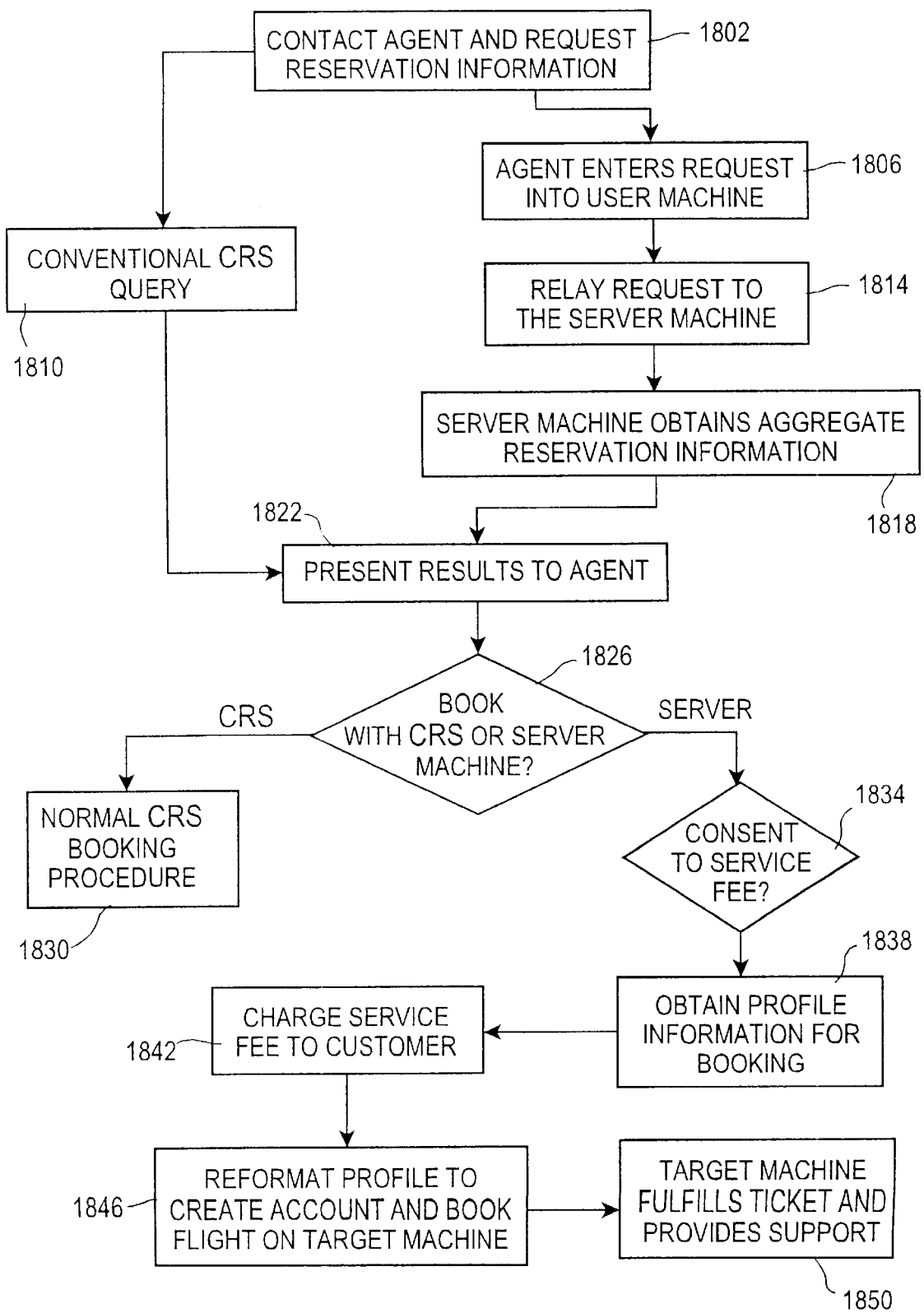
FIG. 18 is a flow diagram of an embodiment of the commercial information system which uses travel agents.

Referring next to FIG. 18, a flow diagram of another embodiment of a commercial information system is shown. In this embodiment, a travel agent provides reservation information to a customer which includes web-only fares as well as fares from a CRS. The customer can have the travel agent book the web-only fare for a fee. A mechanism for seamlessly collecting this fee is provided.

In step 1802, the customer contacts the travel agent in the hope of receiving reservation information. In the traditional manner, the customer describes the desired travel plans. The travel agent enters the travel itinerary into a web page presented by the content display software on the user machine 104 in step 1806. Additionally, the query could be posed to a machine which interfaces to the CRS in the traditional way in step 1810. Alternative embodiments could have the server machine 100 provide reservation information based upon both web-only and CRS information sources. Combining these methods would allow the travel agent to only enter the query once.

The information query for web-only fares is relayed to the server machine 100 whereupon results are returned to the travel agent. In step 1814, the user machine 104 relays the information query over a communications network to the server machine 100. The server machine 100 processes the request in step 1818 so that an aggregate of the available web-only fares is produced which complies with the request. For information which is infrequently posted to target machines 108, the information may already be stored in a database on the server machine 100. Depending upon the amount of web-only fares and frequency at which it changes, a determination is made on the server machine 100 as to whether the information should be gathered earlier or in real time. For target machines 108 which do not provide their information to the CRS services, a real time query is often the preferred course of action. In the case of a real time query, the desired itinerary is reformatted to comply with the particular requirements of the various target machines 108. In a parallel fashion, each of the target machines 108 is queried for their web-only fares. After the target machines 108 have either responded or failed to respond within a predetermined period, the results from the real time and previously gathered reservation information is aggregated. The information may be prioritized and sorted based upon a predetermined criteria so that the most relevant information is presented first.

In step 1822, the results from the CRS and server machine queries are presented to the customer and travel agent. Any restrictions on the reservation can be explained by the travel agent. It is noted, some web-only fares are distressed inventory and commonly subjected to additional restrictions. After presentment of the possible reservation choices, the customer chooses to book either with the CRS based fare or web-only fare in step 1826. If the customer chooses to book the CRS based fare, in step 1830, the travel agent receives payment and issues the ticket in the conventional manner. However, if the customer chooses the web-only fare, the customer is notified of the service fee associated with the travel agent booking that fare in step 1834. A service fee is necessary to compensate the travel agent because the web-only fares are not structured to provide a commission in the traditional manner. Alternatively, the web-only fares could include the service fee before choosing the web-only fare in step 1826, so that the customer is not surprised later. If a customer does not consent to the fee, she is returned to step 1822 where a CRS based fare must be chosen.

If the service fee is consented to in step 1834, the booking process of the web-only fare may continue. If not done previously, an account profile is created on the server machine 100 in step 1838 which includes at least all the information required by the chosen target machine 108. Included in the profile is a payment method such as a credit card. The account profile is stored in the server machine database so that a future booking may avoid step 1838. Proceeding to step 1842, the credit card information from the account profile is used to charge the travel agent service fee.

After obtaining the profile information, the fare may be booked on the chosen target machine 108. The account profile stored on the server machine 100 is reformatted according to the requirements of the target machine 108 in step 1846. The reformatted profile is supplied to the target machine 108 in order to first create an account and then book the reservation. GPSL or JAVA scripts maintained on the server machine 100 control navigation of the target machine 108 to make the query, create or modify an account and book the reservation.

The travel agent notifies the customer when the reservation is successfully booked. In step 1850, the target machine 108 fulfills the ticket and provides any subsequent support. For example, the ticket is mailed to the customer and any changes or modifications are done directly with customer service representatives for the target machine 108. By using the above process, travel agents can provide web-only fares to their customers and be compensated for this service.

Figure 19:
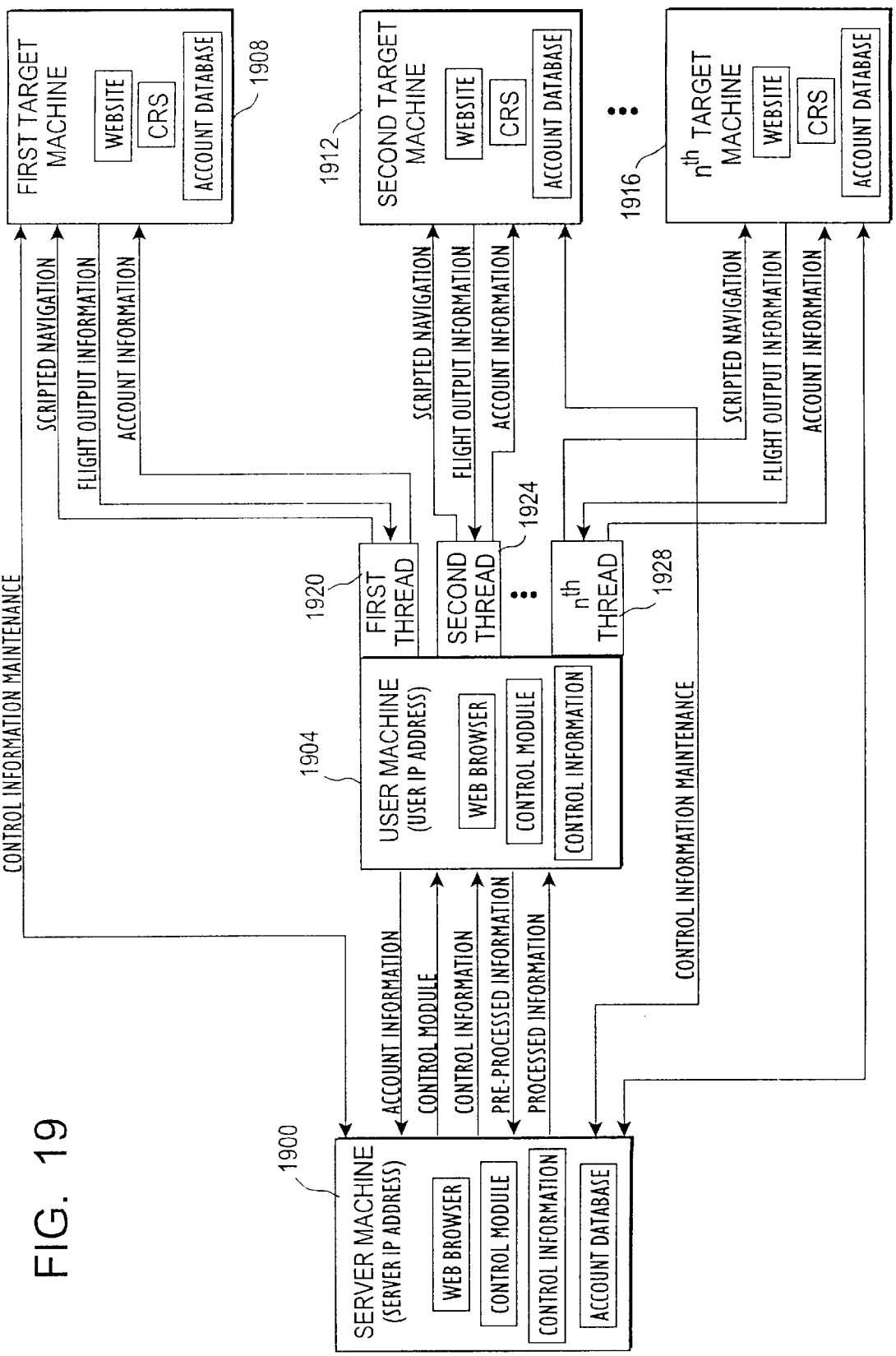
FIG. 19 is a block diagram representation of an embodiment of an automated purchasing system.

With reference to FIG. 19, another embodiment of a commercial information system is disclosed. The commercial information system includes a server machine 1900, a user machine 1904, a first target machine 1908, a second target machine 1912, and a nth target machine 1916. In this embodiment a user machine 1904 directly communicates with the target machines 1908, 1912, 1916 with control information provided by the server machine 1900. Typically, the server, user and target machines 1900, 1904, 1908, 1912, and 1916 are located at distant locales. Information flows between the various machines 1900, 1904, 1908, 1912, 1916 over a global computer network, such as the Internet. The various machines 1900, 1904, 1908, 1912, 1916 communicate with the Internet by any number of methods including, but not limited to, dial-up modems, frame relay, dedicated point-to-point, wireless, cable modems, Ethernet cards, and satellite links. Each machine attached to a network has one or more unique identifiers associated with that machine, such as Internet protocol (IP) addresses. By knowing the IP address of other machines, communication between those machines can either be allowed or blocked. For example, a web site on the first target machine 1908 could block all IP addresses associated with the server machine 1900 such that the server machine could not use the web site on the first target machine 1908.

The server machine 1900 hosts a server web site (or other content providing software) which manages the operation of the commercial information system which automates price comparison and purchasing. Included within the server machine is both hardware and software. The software includes a control module, control information, a server web site, and an account database, while the hardware includes an Internet connection, memory, and one or more processors. The control module takes the form of a web browser plug-in or the like and is used to add functionality to a web browser resident on the user machine 1904. The control module is an executable piece of programming code which allows any standard web browser (e.g., Netscape™ Navigator™ or Microsoft™ Internet Explorer™) to implement specialized functionality formerly not supported in the standard web browser.

Control information is maintained on the server machine 1900 and updated periodically as the target machines 1908, 1912, 1916 modify their respective web sites. Programmers working from the server machine 1900 perform control information maintenance whenever the web site on any target machine 1908, 1912, 1916 changes.

The control information is used by the control module to implement such operations as navigating the target web site in order to receive output information related to a round trip or one-way flight and to create or modify an user account. The control information is implemented with a number of general purpose spider language ("GPSL") script files. The GPSL is a scripting language or an interpreted language. At run-time, the control information scripts are compiled by the control module resident on the user machine 1904 and executed on the user machine 1904. In one embodiment there are four scripts for each target site respectively dedicated to new account setup, existing account modification, round-trip flight query, and one-way flight query. An example of a round-trip flight query for a target web site is included herein as Appendix A.

The web site, resident in the server machine 1900, allows the user to interact with the server machine 1900. Web site software is typically implemented in hyper text markup language (HTML), Java™ and/or ActiveX™. The web site merely allows the user to interface with the server machine 1900 at a remote location with specialized software, such as a web browser. FIGS. 21–25 are examples of web pages generated by the web site and displayed by the web browser on the user's machine. Output information received from the user machine 1904 is processed by the server machine and displayed on a web page generated by the web site.

The account database is a specialized piece of software which stores and correlates information. Input information, such as an account profile, is received by the server machine and stored in the account database. Information from the account database may be displayed on a web page on the server web site or passed to the control module located on the user machine. The account database includes the user's login name, legal name, password, company name, address, telephone number(s), facsimile number, e-mail address, search preferences, and other information.

The hardware within the server machine 1900 includes the Internet connection, memory, and one or more processors. The Internet connection provides a method by which the server machine 1900 connects to the Internet or other network. Memory comes in many forms, but is generally categorized into short-term and long-term memory. Examples of short-term memory include semiconductor memory and are characterized by losing any stored information when power is removed from the machine. Alternatively, long-term memory retains stored information when power is removed and includes such things as magnetic based media. While executing, the software is read from the long-term memory and placed in the short-term memory. The processor performs operations as directed by the various software programs on the server machine. The processor may be a single circuit or a number of circuits working in concert by dividing up the software tasks.

The user machine 1904 generally contains the aforementioned hardware components within the server machine 1900, but may have different software components. Included in the software on the user machine 1904 is a web browser (or content display software), the control module and the control information. The control module and control information are downloaded from the server machine 1904. When the user downloads the control module or plug-in from the server web site, it is installed so that the functionality of the control module becomes integral with the user's web browser. Once the control module is installed, whenever the web browser encounters information of a type reserved for the control module, that information is passed to the control module for processing.

The control module, when installed on the user machine 1904, controls all queries to and pre-processes the output information from the target sites 1908, 1912, 1916. The control module is capable of performing functions on each target site 1908, 1912, 1916 which include setup of a new account, modification of an existing account, and querying information on a one-way flight, and querying information on a round-trip flight. By way of example, the flight query function for a one-way or round-trip flight is described. The web browser, while displaying a travel query page generated by the web site on the server machine 1900, passes the query parameters to the control module. The control module downloads the current control information scripts from the server machine 1900. Updating the scripts in this way, allows updated control information to be available to the control module. To query the target machines for flight information, the control module begins virtual machines in a first thread 1920, a second thread 1924, and a $n^{th}$ thread 1928, where n is equal to the number of target machines. Separate control scripts are compiled and executed in the separate threads so that the flight query to the respective target machine 1908, 1912, 1916 is substantially simultaneous. Threads and virtual machines are mechanisms, supported by modern operating systems and programming languages, which allow simultaneous execution of a number of parallel tasks. As can be appreciated by those skilled in the art, querying the target machines 1908, 1912, 1916 in separate virtual machines allows for more quickly retrieving the flight information. The control module threads 1920, 1924, 1928 perform scripted navigation of their respective target web sites such that the target machine 1908, 1912, 1916 believes the user is navigating the target web site. Once the flight information is output by any target machine 1908, 1912, 1916, the respective thread 1920, 1924, 1928 preprocesses the results and passes the preprocessed results to the server machine 1900 for further processing.

The first, second and nth target machines 1908, 1912, 1916 have hardware similar to the server machine 1900 and user machine 1904, however the software residing thereon may be different. The target machines generally include a web site (or other content providing software), a central reservation system (CRS) and an account database. Interaction with the target machine is managed by the web site which arranges the functions and processes into web pages, and which the user or control module may interact with in order to receive flight information. The CRS is a database which contains flight information and allows performing booking of flights. Typically, the CRS is provided by a third-party and used by many target machines and other travel agents. The account database stores the user profile, among other information, relating to each user.

Figure 20A:
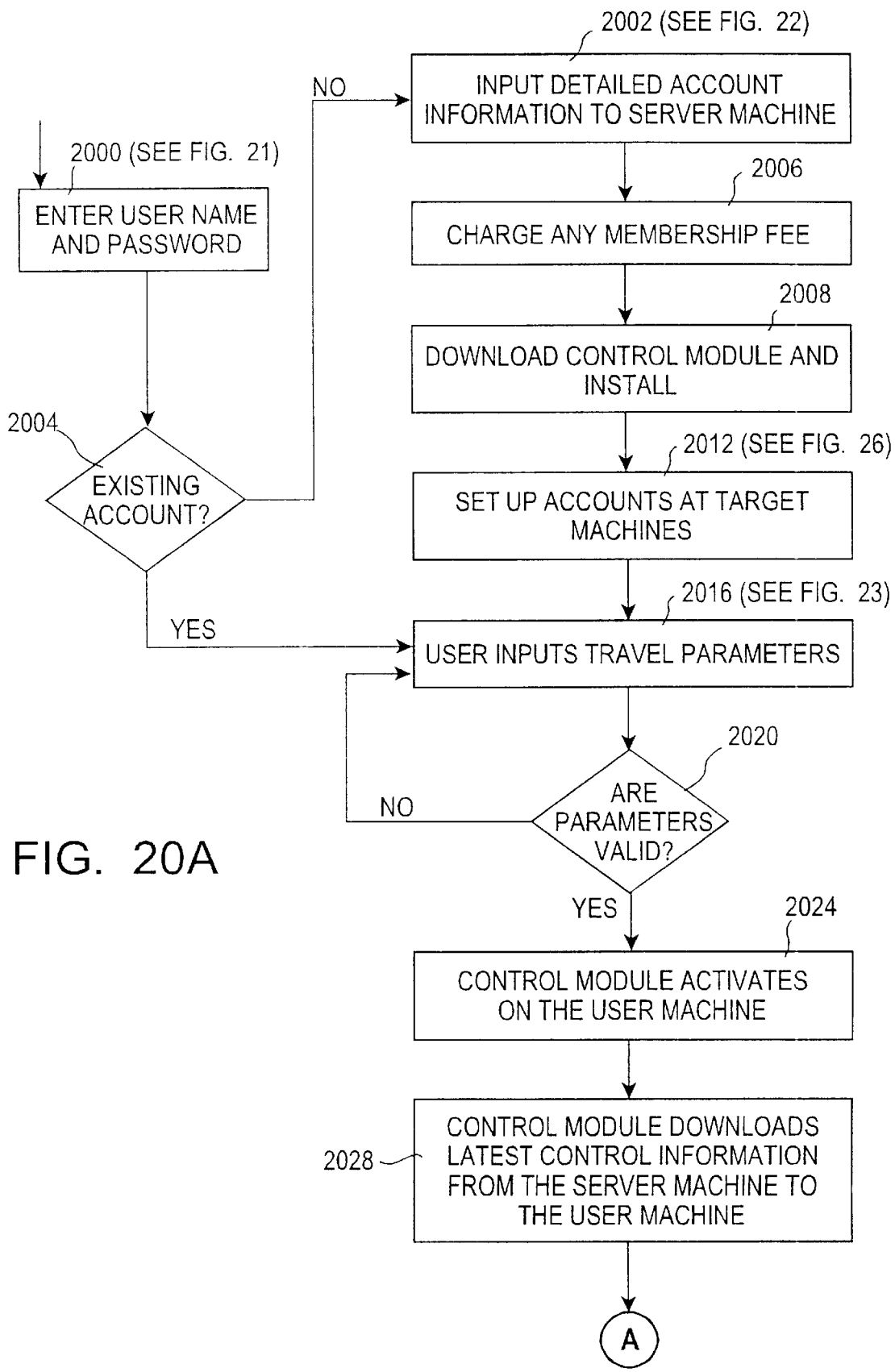
FIG. 20A is a first portion of a flow diagram which depicts the steps undertaken when an user books a flight.

With reference to FIGS. 20A and 20B, a flow diagram of one embodiment of the process by which the server web site books a flight is disclosed. The user, interacting with the web browser on the user machine 1904, enters the uniform resource locator (URL) for the web site on the server machine 1900. In step 2000, the server web site displays a login page, a example of which is shown in FIG. 21, to prompt the user to enter a login name 2100, a password 2104, and an e-mail address 2108. After the user clicks on a go button 2112, the web site accesses the account database in step 2004 to determine if the login name 2100 and password 2104 match any known accounts in the database. If the user has an existing account, the next web page to be displayed in step 2016 allows the user to enter travel parameters. An example of this web page is shown in FIG. 23.

If step 2004 determines that the user does not have an account on the server machine 1900, accounts are setup on the server web site and the target web sites. In step 2002, the user fills out a web page entry form which asks for such information as name, address, company name, phone numbers, and other information. An example of this web page entry form is shown in FIG. 22. If compensation for the use of the automatic flight searching is required, in step 2006, the user is charged for this service. A web page form which requests a credit card or other payment could be displayed to allow the user to compensate the server web site. In step 2008, a web browser control module (or plug-in) is downloaded from the server machine to the user machine whereafter the control module is installed. The control module adds functionality to the user's web browser which allows the web browser to perform specialized searches of the target machines 1908, 1912, 1916 and interpret the results therefrom.

Once the control module is integrated into the web browser in step 2008, accounts are setup on the target machines 1908, 1912, 1916 in step 2012, as needed. The user is prompted for any preexisting accounts on any target machines 1908, 1912, 1916. For the target machines without preexisting accounts, control information in the form of a GPSL script is downloaded from the server machine 1900 by the control module. The GPSL scripts are compiled and executed in separate threads so that any accounts may be simultaneously setup on the target machines 1908, 1912, 1916. The GPSL scripts navigate the target web site and fill-in the appropriate information to create the account on each target machine 1908, 1912, 1916. Information previously entered into the server account database in step 2002 is used to create the accounts at the target web sites. FIG. 25 provides further details on the establishment of accounts on the target machines 1908, 1912, 1916.

Once the new user establishes any accounts on the server machine 1900 and target machines 1908, 1912, 1916, they are considered an existing user which entitles them to use the automated flight search functions provided by the server machine 1900. Travel parameters are received by the server web site from the user in step 2016. An example of a server web page the user interacts with to provide the travel parameters is shown in FIG. 23. Once the travel parameters are received by the server machine 1900, the travel parameters are processed to determine if they are valid in step 2020. If the parameters are determined invalid, the user is returned to step 2016 in order to remedy the problem.

In step 2024, the control module (or plug-in) is activated within the user's web browser. The activation is triggered by the server machine 1900 passing the travel parameters to the web browser. After the web browser recognizes the data stream is meant for the control module, the control module is activated and the data stream is provided to the control module whereupon the control module loads. Once activated, the control module downloads the current control information (or GPSL scripts) from the server machine 1900 in step 2028. Downloading the current control information immediately before use in this way increases the likelihood the control information will correctly interact with the web sites on the target machines 1908, 1912, 1916.

Once the control module has current control information for each target web site, separate threads 1920, 1924, 1928 are begun in virtual machines on the user's machine 1904 in step 2032. Each separate thread 1920, 1924, 1928 is dedicated to interacting with its respective target machine 1908, 1912, 1916. Accordingly, each thread 1920, 1924, 1928 has a separate GPSL script to use as control information. An example of a round-trip flight GPSL script for a particular target site is attached hereto as Appendix A. As those skilled in the art can appreciate, by utilizing threads, the query for flight information from the target sites is performed in parallel fashion.

In steps 2036, 2044, 2052, the separate threads respectively query the first through $n^{th}$ target machines 1908, 1912, 1916 for flight information. The control module and control information interact with the target machine 1908, 1912, 1916 in the same way a user using a web browser would. However, none of the pages sent from the target web site are displayed on the user's web browser because the control module intercepts the information. As can be appreciated by those skilled in the art, eliminating the displaying step and automating the navigation of the target sites greatly increases the speed at which the sites are queried.

One problem associated with querying each target site is the disparate formatting and input particulars of the search page on the target site. The control module, as directed by the control information, converts the travel parameters received in step 2016 into the format required by the particular target web site. By automating the search process on the first through $n^{th}$ target machines 1908, 1912, 1916, the user is no longer required to discern the different web pages and manually enter the travel parameters a number of times.

After successfully querying each target web site in steps 2036, 2044, 2052, the separate threads 1920, 1924, 1928 receive the output information therefrom and respectively pre-process those results in steps 2040, 2048, 2056. If a particular thread 1920, 1924, 1928 does not respond with flight information before a predetermined time expires, the thread 1920, 1924, 1928 will time-out and stop execution before returning any output information. Preferably, the time-out period is programmable by the user. Pre-processing of the output information by the respective thread 1920, 1924, 1928 may include sorting for the best departure/arrival time, least travel time, most direct flight, cheapest flight, preferred carrier, most frequent flyer miles, best in-flight accommodations, and/or other parameters. Each thread 1920, 1924, 1928 passes the pre-processed output information gathered from its respective target site to the server machine 1900.

In step 2060, the server machine 1900 further processes the output information from the target machines 1908, 1912, 1916. The output information from a particular site may be compared to the information from other sites so that the web page on the server machine 1900 displays the information based upon a predetermined priority. Advertising or other information may be inserted into the server web page before it is displayed to the user in step 2064. An example of the flight search results web page is shown in FIG. 24. Upon viewing the search results, the user selects the preferred flight displayed on the server web page in step 2068. In this way, the user can select from a number of target sites in order to effectively comparison shop between the target sites. As can be appreciated, the ability to compare in this way, tends to provide the user with a flight most suitable to their predetermined preferences.

Once a preferred flight is selected, the user is forwarded to the selected target machine to complete the booking process in step 2072. Depending upon the idiosyncracies of the target site, the user will generally select their flight and proceed to pay for that flight. Generally a booking page is presented to the user. In step 2076, the control module and control information prepopulates the booking page on the target site with information from the account database on the server machine 1900. An example of a booking page is shown in FIG. 25 where the user name and meal preference has been prepopulated. In this way, a minimum of interaction is required by the user when completing the booking process in step 2080.

It has been suggested, target machines 1908, 1912, 1916 may be reluctant to allow automated comparisons of flight information in this way. If the server machine 1900 were to query the target machines 1908, 1912, 1916 directly, software on the target machine could block access to the target site from the IP address associated with the server. However, since the user's IP address originates all queries to the target web sites, blocking the various user IP addresses is impractical. "IP masking" in this manner makes it difficult and/or impossible for the target machines 1908, 1912, 1916 to block comparison shopping.

It is noted that the plug-in feature of popular web browsers is utilized to implement the control module with control information. However, in another embodiment a Java™ and/or an ActiveX™ applet or the like could be used to implement IP masking such that the target machines 1908, 1912, 1916 would have difficulty blocking the comparison shopping. An applet is defined herein to include a Java™ and/or an ActiveX™ program or the like. In this embodiment, the user would receive the applet from the server machine 1900, whereupon the applet, executing on the user machine 1904, would query the target machines 1908, 1912, 1916. The flight output information would be passed to the server machine and displayed on a web page in the user's web browser. Since the applet makes the queries, the user IP address is used which similarly makes blocking by the target site impractical.

With reference to FIG. 21, an example login web page is depicted. The web page allows a new or existing user to enter their login name 2100, password 2104 and e-mail address 2108. There is also a provision for retrieving a forgotten password. Once the user has entered this information the user activates a button 2112 to enter the server web site.

Next referring to FIG. 22, a page for adding a new account to the server machine 1900 is shown. When a login name and password does not match any existing account in the server database, it is presumed the user needs to setup a new account. The user enters information such as name and address 2200, contact information 2204, any existing accounts with target sites 2208, and miscellaneous information 2212 in order to become an existing user. Some fields in the form are marked optional so that the user knows which fields are required to setup an account. This account information is stored in the account database on the server machine 1900.

A flight planning page is shown in FIG. 23 which allows the user to enter the desired flight parameters. The user selects a type of flight 2300, any target sites 2304, departure information 2308, return information 2312, number of passengers 2316, and an amount of time 2320 each thread is given 1920, 1924, 1928 to provide results. This information is parsed and passed to the control module on the user machine 1904.

With reference to FIG. 24, a page which displays the results from searching the target sites is shown. A first itinerary 2400 from a first target machine 1908 and a second itinerary 2404 from a second target machine 1912 is shown.

The user may select either fare for booking, whereupon the user to forwarded to the selected target site. FIG. 25 shows an example of booking page on the selected target site. Information from the account database can be passed to the page on the target site to prepopulate the page as necessary.

Another embodiment of the process for accepting a new user is illustrated in the flow diagram of FIG. 26. The user is presented a web page by the server machine 1900 which requests a new user profile be entered in step 2600 and requests any account information in step 2604. A determination is made by the server machine 1900 in step 2608 as to whether the user specified an existing account on the target sites in step 2604. If no existing account was specified, the control module or "spider" begins creation of an account in step 2612. It is noted, FIG. 26 only shows interaction with a single target site. It is to be understood however, that the steps 2612, 2616, 2620, 2624, 2628 are within a thread 2610 and are performed in separate virtual machines. In other words, the search queries to the target sites are encapsulated in separate threads 1920, 1924, 1928, where one of the threads 2610 is shown in FIG. 26.

In step 2616, the account information is retrieved from the account database on the server machine 1900 whereupon it is parsed and reformatted based upon the requirements of the target site. The target web site is manipulated by the control module in step 2620, as prescribed by the control information, so that the target web site activates the new account sign up page. In step 2624, the control module enters the properly formatted account information into the sign up page. If the sign up process is successful on the target site as determined in step 2628, that site is added to the list of sites the user may choose from when later performing a flight information search. Upon completion of the thread 2610, the user is notified of their new accounts on any target machines 1908, 1912, 1916. It should be noted, most of the account creation process happens transparently such that the user only interacts with the server web site in steps 2600, 2604, 2632.

With reference to FIG. 27, a flow diagram of one embodiment of the process by which the control module or plug-in is activated and utilized on the user machine. Some of the software modules associated with each step are parenthetically noted therein (see FIGS. 29–33). In step 2700, the web browser on the user machine 1904 receives content from the Internet which is recognized as belonging to the control module. The browser loads and initializes the control module in step 2704. Once loaded, the control module receives the content from the server machine 1900 (e.g., The Trip-.Com server machine) in step 2708. The content includes the control information in the form of a GPSL script.

In this embodiment, the control information or GPSL scripts are parsed and compiled by the control module in step 2712. A web page, produced by the server machine 1900, displays a progress bar in step 2716 to give a positive indication to the user that the search is progressing. A thread manager portion of the control module begins execution the search for each target site in a separate thread in step 2720. The user continues to see the progress bar until all threads have completed or timed-out in step 2724. The results from each target site are preprocessed in step 2728 before being passed to the server machine 1900. Further processing occurs on the server machine before display of the search results in step 2732.

Figure 28:
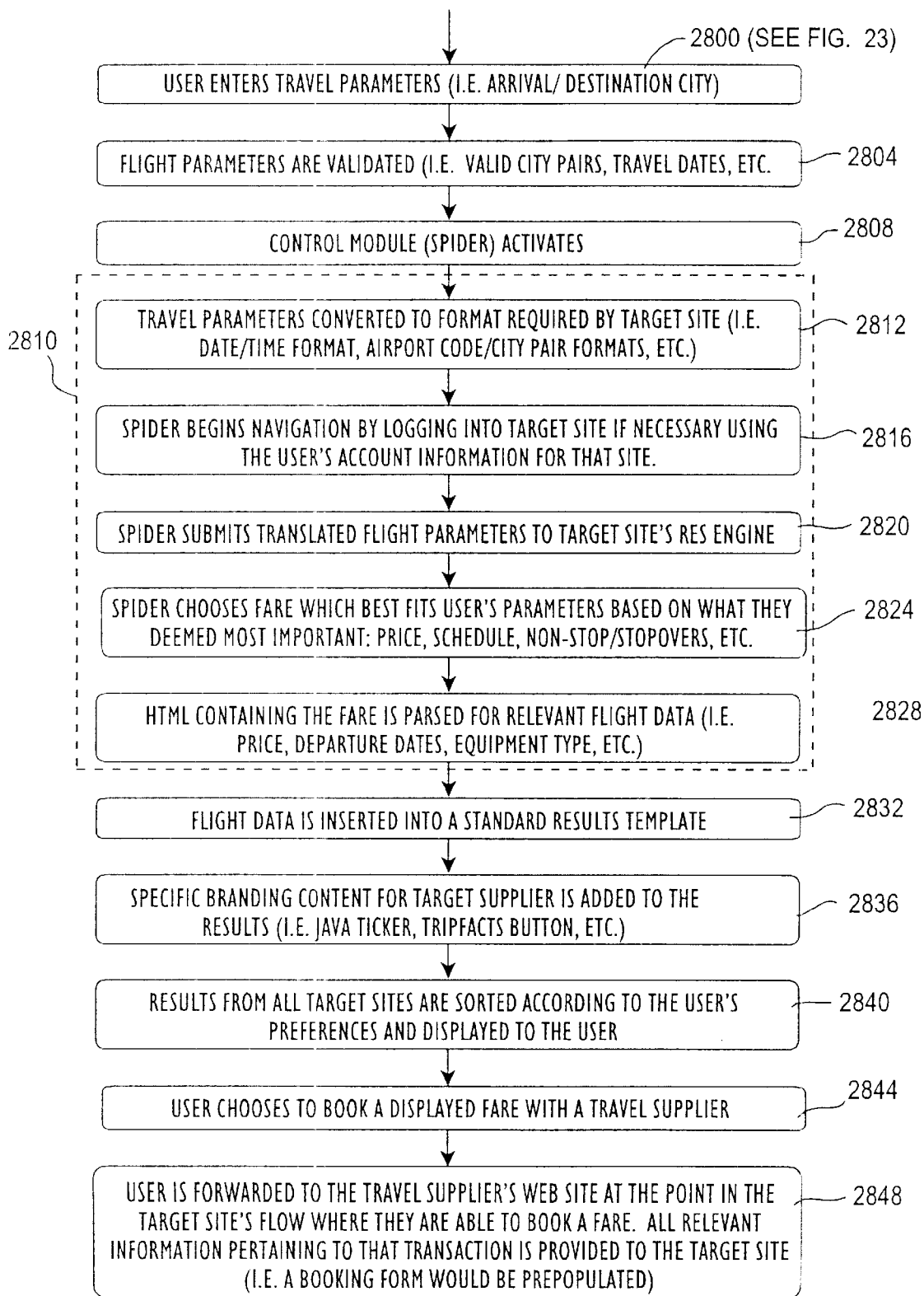
FIG. 28 is a flow diagram which describes the steps performed during a search for flight information at one or more target machines.

With reference to FIG. 28, an embodiment of the search process is described in a flow diagram. In a first step 2800, the user enters travel parameters into a web page on the server machine 1900. An example of a travel parameter entry form is shown in FIG. 23. After entry of the parameters, they are validated in step 2804. A control module or "spider" is passed the travel parameters in step 2808 whereupon a thread 2810 is begun for each target search site. Although FIG. 28 only shows a single thread 2810, it is to be understood separate threads activate for each target web site.

A number of steps are performed in the thread 2810. The travel parameters obtained in step 2800 are converted by the control module to the format required by the target site in step 2812. The control module performs the scripted navigation dictated by the control information within the GPSL scripts in step 2816 to log into the target site and go to the flight search page on the target site. In step 2820, the control script submits the translated flight parameters to the central reservation system (CRS) input page on the target machine. In step 2824, the results presented by the target site are analyzed according to a criteria supplied by the user and the best fares are selected. The selected flight information is extracted from the target site in step 2828. An output information template is created on a web page in step 2832 which stores the flight data. In step 2836, additional information is added to the web page. As results arrive from other target sites their respective information templates are inserted into the web page in step 2840 according to a predetermined criteria. Once all the output information is gathered and displayed, the user may choose a particular flight to book in step 2844. The user is forwarded to the target site to continue booking the fare in step 2848. Any information within the server's account database is used to prepopulate the forms on the target site.

Figure 30:
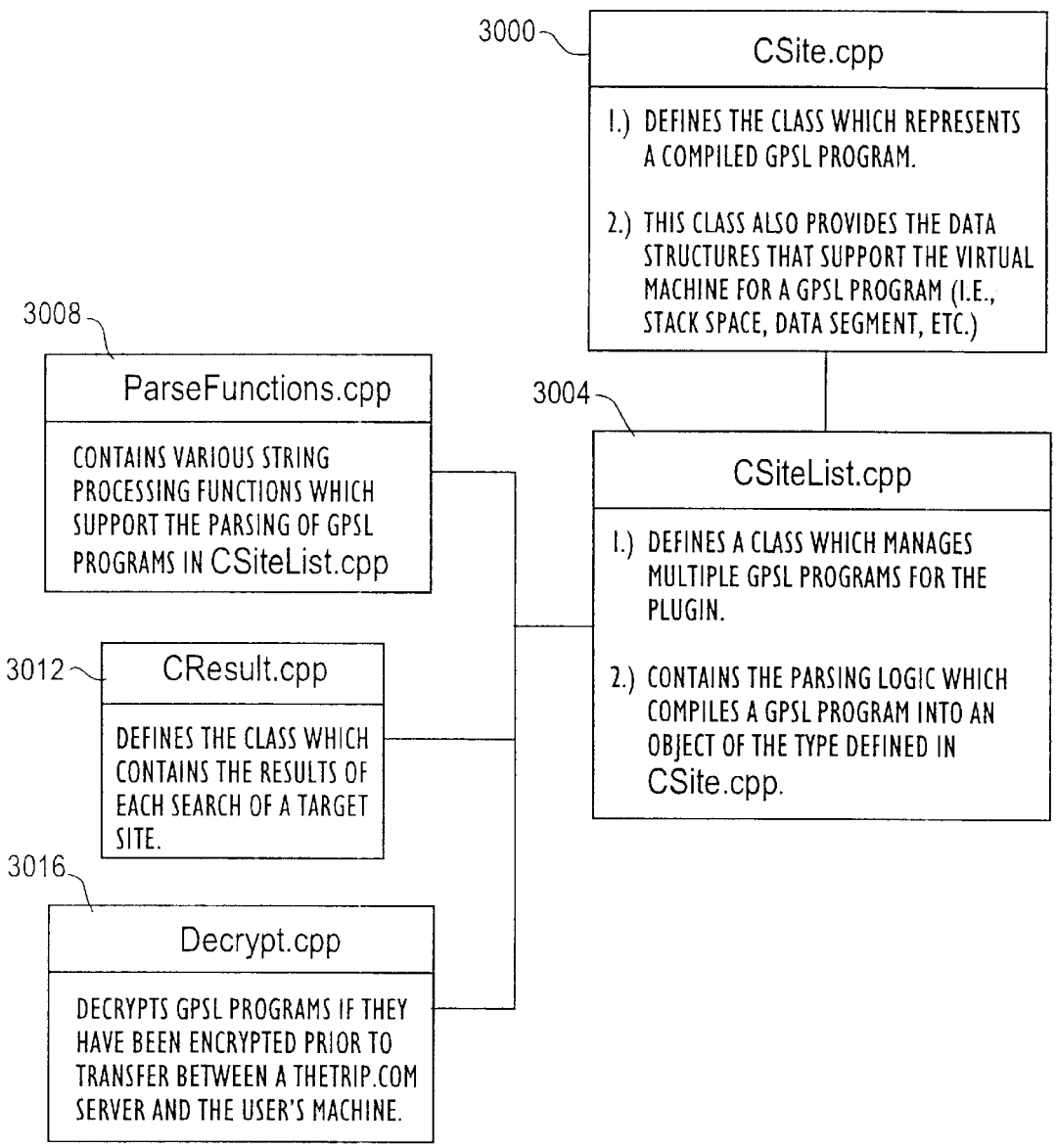
FIG. 30 is a block diagram representation of a portion of the control module which includes the control information compiler, control information execution and virtual machine.

FIGS. 29–33 are block diagrams which provide an interrelationship between the various software modules or files which comprise the control module or plug-in. The source code for the control module is provided in Appendix C attached hereto. With reference to FIG. 29 the software modules which form the GPSL language core are depicted. These software objects represent the native implementation of GPSL. Referring to FIG. 30, the software modules, which create the virtual machine and compile the GPSL scripts, are shown with their interrelationship. These modules build and run the GPSL scripts. With reference to FIG. 31, the software modules which form the thread manager are displayed. The thread manager regulates the simultaneous execution of a plurality of compiled GPSL scripts.

Figure 32:
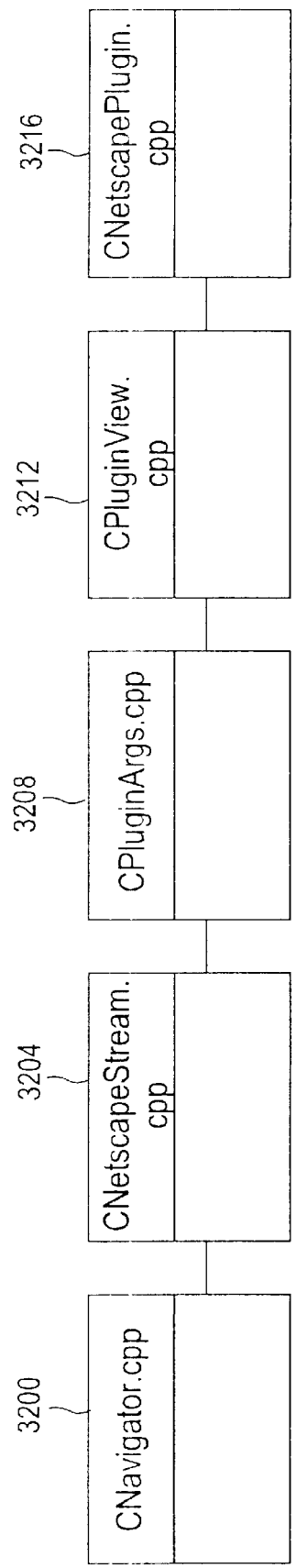
FIG. 32 is a block diagram representation of a portion of the control module which includes third-party components for starting, stopping and loading the control module.
Figure 33:
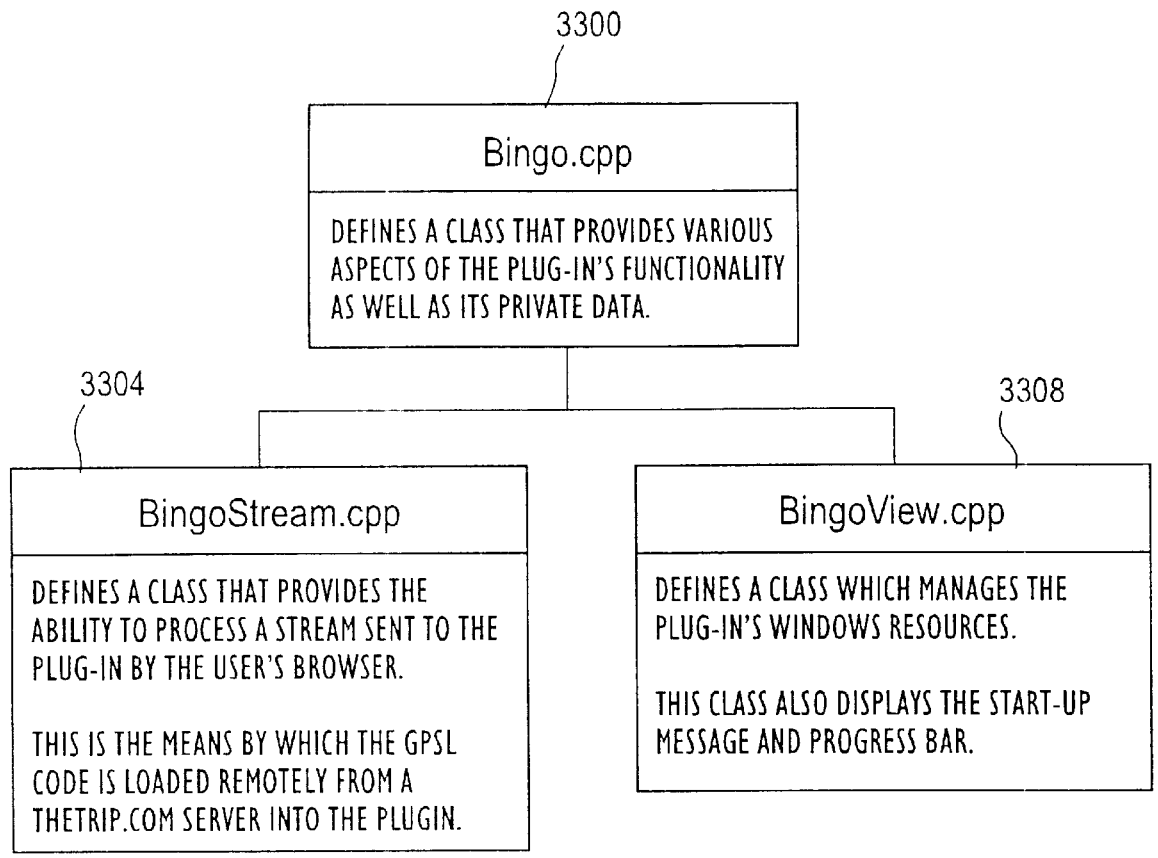
FIGS. 33 is a block diagram representation of a portion of the control module which includes additional third-party components to assist in integrating the automated purchasing functions with the user's web browser.

FIGS. 32 and 33 show software modules provided by a third party for implementing a plug-in. Netscape™ provides these routines to developers so that functionality may be added to Navigator™, which is a web browser provided by Netscape™. Although it should be noted, other web browsers also support plug-ins which use these routings such as Microsoft™ Explorer™. FIG. 32 shows some of the standard plug-in source files which Netscape™ provides so that developers may implement a plug-in or control module. Included within these software modules are functions for downloading, installing, starting and stopping a plug-in. Referring to FIG. 33, additional software modules provided by Netscape™ which add functionality to the plug-in are shown. These modules add various classes and functions useful in implementing a plug-in.

With reference to Appendices A and B, the operation of the general purpose spider language ("GPSL") scripts are explained. GPSL is a scripted or interpreted programming language which simply means the GPSL files are compiled immediately prior to execution by the user. This is to be contrasted to other languages which are compiled once by the developer and sent to the user in a compiled form.

The GPSL scripts are developed by programmers associated with the server machine 1900. Control information maintenance is important because the target sites change periodically, and if the scripted navigation of the target site missteps, the search of the target site may fail to complete. Accordingly, it is important that the control module on the user machine 1904 be periodically updated. The GPSL scripting language facilitates these goals.

With reference to Appendix B, a GPSL language overview and reference guide are provided. The remote navigation of a web site presents problems which are not well served by traditional programming languages. A goal of the GPSL scripting language is to quickly be able to modify the control information as the target web sites change. An additional goal is to allow changes to the control information with a high-level language. As can be appreciated by those skilled in the art, the ease at which the GPSL scripts can be modified allows use of less trained programmers.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. By way of example only, the invention need not be limited to booking of airline flights. Other applications can be implemented incorporating the principles of the present invention including reserving vehicles, product and service purchases and leasing of products. The embodiments discussed hereinabove are further intended to explain the best mode known of practicing the inventions and to enable others a skilled in the art to utilize the inventions in such, or in other embodiments and with the various modifications required by their particular application or uses of the inventions. It is intended that the appended claims be construed to include alternative embodiments to the extent permitted by the prior art.

What is claimed is:

1. A method involving reservation information, comprising:

receiving a first request during a first session by a control system from a user machine of a first customer for reservation information, said request including customer input data of the first customer related to said reservation information, said user machine being located remotely from said control system and communicating with said control system using a communications network;

requesting by said control system said reservation information using said customer input data from a plurality of reservation information sites including a first reservation information site and a second reservation information site which are located remotely from each of said user machine and said control system, said first and second reservation information sites being associated with first and second account databases and first and second network interfaces, respectively, each of said first and second reservation information sites being configured to communicate with said user machine of the first customer without intervention from said control system wherein, when said user machine is connected to at least said first reservation information site using said network interface thereof, said user machine is configured to be able to provide at least account information of the first customer to said first reservation information site;

obtaining said reservation information including obtaining first reservation information from said first reservation information site by said control system and obtaining second reservation information from said second reservation information site by said control system, said first reservation information originating from a first provider thereof and said second reservation information originating from a second provider thereof, said first reservation information site providing only said first reservation information and said second reservation information site providing only said second reservation information;

processing said reservation information including said first reservation information and said second reservation information using processing software to provide processed reservation information;

presenting said processed reservation information utilizing said user machine; and performing a booking function related to said processed reservation information based on input received from said user machine and using at least one of said first and second reservation information sites, wherein, when said performing step uses said first reservation information site, said performing step includes: (i) checking whether first account information related to identification of the first customer is stored using said first account database, said stored first account information being based on at least a previous communication with said first reservation information site and (ii) at least when said checking step determines that said first account information is not stored, providing first account information related to identification of the first customer to said first reservation information site by said control system and in which said first account information includes at least some account information received by said control system from said user machine and said first account information is stored using said first account database;

wherein, when said performing step uses said second reservation information site, said performing step includes: (i) checking whether second account information related to identification of the first customer is stored using said second account database, said stored second account information being based on at least a previous communication with said second reservation information site and (ii) at least when said checking step determines that said second account information is not stored, providing second account information related to identification of the first customer to said second reservation information site and in which said second account information includes at least some account information received by said control system from said user machine and said second account information is stored using said second account database.

2. A method, as claimed in claim 1, wherein:

said requesting step includes inputting said customer input data to said first reservation information site based on a first format and inputting said customer input data to said second reservation information site based on a second format that is different from said first format.

3. A method, as claimed in claim 2, further including:

modifying said first format depending upon a change made at said first reservation information site.

4. A method, as claimed in claim 1, wherein:

said first reservation information is obtained in real time from said first reservation information site and in which said first reservation information is updated under control of said first provider.

5. A method, as claimed in claim 1, wherein:

said presenting step includes displaying on said user machine said processed reservation information that is different from each of said first reservation information and said second reservation information.

6. A method, as claimed in claim 1, wherein:

said customer input data includes at least an airline flight time period, a city destination, and a flight date.

7. A method, as claimed in claim 1, wherein:

said processed reservation information includes at least an airline ticket price, a flight identification, and a flight date and time.

8. A method, as claimed in claim 1, wherein:

said performing step includes booking an airline flight for the first customer.

9. A method, as claimed in claim 8, further including:

storing first customer information associated with the first customer after said booking step.

10. A method, as claimed in claim 8, further including:

retrieving customer information related to the first customer and using said customer information of the first customer in conducting another requesting step.

11. A method, as claimed in claim 1, wherein:

said reservation information includes airline reservation information and said method further includes maintaining an historical database for number of customers in which said historical database stores customer information related to previously booked airline reservations.

12. A method, as claimed in claim 1, further including:

logging at least one error upon its occurrence and indicating successful completion of said first session upon its occurrence.

13. A method, as claimed in claim 1, wherein:

said obtaining step includes collecting said reservation information by said control system at a time before said receiving step.

14. A method, as claimed in claim 1, further including the step of:

entering the first request into said user machine by an agent of the first customer.

15. A method, as claimed in claim 14, further including:

after said performing step, charging a service fee to the first customer which is paid to the agent.

16. A system for providing processed reservation information to a user machine of a first customer, comprising:

a plurality of reservation information sites including a first reservation information site of a first provider and a second reservation information site of a second provider, said first reservation information site comprising a first target machine and said second reservation information site comprising a second target machine, said first reservation information site providing only first reservation information and said first reservation information originating from the first provider, said second reservation information site providing only second reservation information and said second reservation information originating from the second provider, at least said first and second reservation information sites being associated with first and second account databases and first and second network interfaces, respectively; and a control apparatus located remote from said first and second reservation information sites and the user machine, each of said first and second target machines being configured to communicate with the user machine of the first customer independently of said control apparatus wherein, when the user machine is connected to at least said first reservation information site using said first network interface, the user machine is configured to be able to provide account information, said control apparatus including:

a memory subsystem for storing account information; and a processing subsystem in communication with said memory subsystem that receives a first request during a first session related to reservation information including said first reservation information and said second reservation information, said first request including customer input data from the user machine, said processing subsystem for use in formatting said customer input data for input to said first target machine according to a first format, said processing subsystem also used in sending said customer input data based on said first format to said first target machine and obtaining said first reservation information, said processing subsystem for use in formatting said customer input data for input to said second target machine according to a second format, said processing subsystem also used in sending said customer input data based on said second format to said second target machine and obtaining said second reservation information, said processing subsystem processing said first reservation information and said second reservation information to produce processed reservation information, said processing subsystem involved with performing a booking function related to said processed reservation information, said booking function performed using at least one of said first and second reservation information sites;

wherein, when said booking function uses said first reservation information site, said control apparatus provides first account information related to identification of the first customer to said first reservation information site and in which said first account information includes at least some account information received by said control apparatus from the user machine and said first account information is stored using said first account database;

wherein, when said second reservation information site is used, said control apparatus provides second account information related to identification of the first customer to said second reservation information site and in which, when said control apparatus provides said second account information, said second account information includes at least some account information received by said control apparatus from said user machine and said second account information is stored using said second account database.

17. A system, as claimed in claim 16, wherein:

said memory subsystem includes memory that stores historical information related to a plurality of the following: lowest airline fare found between two city pairs for a given airline carrier; most commonly requested city pairs; lowest overall fare found between two city pairs; average number of requests submitted by the first customer during said first session; identity of the airline carrier most often booked for a particular city pair; and identity of an airline carrier that is selected most often overall in booking airline flights.

18. A system, as claimed in claim 16, wherein:

said memory subsystem includes memory that stores logging information related to at least one error that occurs, an indication of a successful completion of a request by the first customer, an indication of a successful account creation and an indication of a successful account modification.

19. A system, as claimed in claim 16, wherein:

said first account information is stored in said memory subsystem and related to the first customer's preferences based on previously booked reservations.

20. A system, as claimed in claim 16, wherein:

said processing subsystem includes processing software that checks whether said first account information is previously stored in said memory subsystem.

21. A system, as claimed in claim 16, wherein:

said processing subsystem includes processing software that retrieves said first account information from said memory subsystem and uses said first account information from said memory subsystems in obtaining said customer input data.

22. A system, as claimed in claim 16, wherein:

said processing subsystem includes processing software that updates said first account information related to a profile of the first customer.

23. A system, as claimed in claim 16, wherein:

said processing subsystem includes processing software that caches at least some of said first customer information obtained during said first session in said memory subsystem.

24. A system, as claimed in claim 16, wherein:

said customer input data is entered into the user machine by an agent of the first customer.

25. A system, as claimed in claim 16, wherein:

said processing subsystem uses said first account information to collect a service fee for an agent of the first customer.

26. A system that includes a plurality of user machines of a plurality of customers including at least first and second user machines of first and second customers, respectively, and a communications network, comprising:

a plurality of target sites including at least first and second target sites that can communicate with each of said user machines using said communications network, said first and second target sites being associated with first and second account databases, respectively, said first target site providing only first output information and said first output information originating from a first provider, said second target site providing only second output information and said second output information originating from a second provider; and a server machine that receives a number of input information items from said first user machine, each of said plurality of target sites being configured to communicate with each of said plurality of user machines without intervention of said server machine, said server machine comprising:

a memory for storing a control module that can be downloaded to each of said user machines, wherein, when said control module is downloaded to each of said user machines, said control module facilitates communications between each of said user machines and each of said target sites; and processing hardware in operative communication with said memory and said processing hardware including at least a first processor, wherein said number of input information items are utilized by said control module to output said first and second output information from said first and second target sites, respectively, at least one of said processing hardware and said first user machine processing said first and second output information and providing determined information based on said first and second output information;

wherein a first choice is made using said determined information, said first choice involving at least one of said first and second target sites and, when said first target site is involved, said control module is used to provide first account information related to identification of the first customer to said first target site and in which said first account information includes at least some account information received by said control module using the first user machine and said first account information is stored using said first account database and, when said second target site is involved, said control module is used to provide second account information related to identification of the first customer to said second target site, said second account information includes at least some account information received by said control module using the first user machine and said second account information is stored using said second account database.

27. A system, as claimed in claim 26, wherein:

said server machine accesses said first target site to obtain updated information from said first target site, said server machine using said updated information to provide control information, said control module and said control information are provided to said first user machine at different times.

28. A system, as claimed in claim 26, wherein:

said first target site has a first input format and said second target site has a second input format, wherein one of said processing hardware and said first user machine formats said number of input information items to said first input format and to said second input format in order to obtain said first and second output information from said first and second targets, respectively.

29. A system as claimed in claim 26, wherein:

at least one of said processing hardware and said first user machine determines that said first output information from said first target site is to be provided to said first user machine after a comparison with said second output information from said second target site.

30. A system, as claimed in claim 26, wherein:

said first user machine pre-processes said first and second output information from each of said first and second target sites, respectively and communicates said pre-processed first and second output information to said server machine and in which said processing hardware further processes said pre-processed first and second output information from each of said first and second target sites, respectively.

31. A system, as claimed in claim 26, wherein:

at least one of said processing hardware and said first user machine checks for a predetermined delay related to obtaining said first output information from said first target site and, when said predetermined delay is exceeded, said first user machine discontinues seeking said first output information from said first target site.

32. A system, as claimed in claim 26, wherein:

said first output information includes information related to at least one of the following: airline flight reservations, vehicle reservations, lodging reservations, product leasing, product purchasing and service purchasing.

33. A system, as claimed in claim 26, wherein:

said control module is implemented with at least one of the following: a web browser plug-in and an applet.

34. A system, as claimed in claim 26, wherein:

each one of said plurality of target sites provides only output information originating from a respective one provider thereof.

35. A system, as claimed in claim 26, wherein:

each of said plurality of target sites includes a web site including a first web site being associated with the first provider and a second web site being associated with the second provider.

36. A system, as claimed in claim 35, wherein:

said control information is used by said server machine to navigate said web sites.

37. A system, as claimed in claim 36, wherein:

said control information is used in reserving an airline flight.

\* \* \* \* \*